(12) United States Patent
Kannan et al.

(10) Patent No.: US 11,797,280 B1
(45) Date of Patent: Oct. 24, 2023

(54) BALANCED PARTITIONING OF NEURAL NETWORK BASED ON EXECUTION LATENCIES

(71) Applicant: Amazon Technologies, Inc., Seattle, WA (US)

(72) Inventors: Parivallal Kannan, San Jose, CA (US); Fabio Nonato de Paula, Livermore, CA (US); Preston Pengra Briggs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 161 days.

(21) Appl. No.: 17/305,150

(22) Filed: Jun. 30, 2021

(51) Int. Cl.
| | |
|---|---|
| *G06F 8/41* | (2018.01) |
| *G06F 9/50* | (2006.01) |
| *G06N 20/00* | (2019.01) |
| *G06N 3/042* | (2023.01) |

(52) U.S. Cl.
CPC .............. *G06F 8/441* (2013.01); *G06F 8/451* (2013.01); *G06F 9/5044* (2013.01); *G06F 9/5066* (2013.01); *G06N 20/00* (2019.01); *G06F 2209/5019* (2013.01); *G06F 2212/1024* (2013.01); *G06N 3/042* (2023.01)

(58) Field of Classification Search
None
See application file for complete search history.

(56) References Cited

U.S. PATENT DOCUMENTS

| | | | | |
|---|---|---|---|---|
| 10,872,038 | B1* | 12/2020 | Nair ....................... | G06F 9/3001 |
| 11,210,586 | B1* | 12/2021 | Duong ..................... | G06N 3/04 |
| 2018/0314945 | A1* | 11/2018 | Breternitz ................ | G06N 3/04 |
| 2019/0034785 | A1* | 1/2019 | Murray .................... | G06N 5/04 |
| 2019/0147318 | A1* | 5/2019 | Howard ................... | G06N 3/04 |
| | | | | 706/27 |
| 2019/0340010 | A1* | 11/2019 | Lee ......................... | G06F 9/5066 |
| 2020/0143254 | A1* | 5/2020 | Dey ......................... | G06N 3/04 |
| 2020/0175361 | A1* | 6/2020 | Che ......................... | G06N 3/048 |
| 2021/0103473 | A1* | 4/2021 | Lin ......................... | G06F 9/5016 |
| 2021/0173787 | A1* | 6/2021 | Nagy ................... | G06F 12/0875 |
| 2021/0191765 | A1* | 6/2021 | Bokam ................... | G06F 18/29 |

* cited by examiner

*Primary Examiner* — Abu Zar Ghaffari
(74) *Attorney, Agent, or Firm* — Weaver Austin Villeneuve & Sampson LLP

(57) ABSTRACT

Techniques to partition a neural network model for serial execution on multiple processing integrated circuit devices are described. An initial partitioning of the model into multiple partitions each corresponding to a processing integrated circuit device is performed. For each partition, an execution latency is calculated by aggregating compute clock cycles to perform computations in the partition, and weight loading clock cycles determined based on a number of weights used in the partition. The amount of data being outputted from the partition is also determined. The partitions can be adjusted by moving computations from a source partition to a target partition to change execution latencies of the partitions and the amount of data being transferred between partitions.

21 Claims, 12 Drawing Sheets

BALANCED PARTITIONING OF NEURAL NETWORK BASED ON EXECUTION LATENCIES

BACKGROUND

Neural networks utilize computational models to perform complex tasks such as natural language processing. A neural network can perform computations using a set of weights. Through these computations, the weights are combined with input data (which can also be referred to as feature maps) through multiple layers to perform an inference operation. Some neural network models such as deep learning models can utilize thousands or even millions of weights.

BRIEF DESCRIPTION OF THE DRAWINGS

Various embodiments in accordance with the present disclosure will be described with reference to the drawings, in which.

DETAILED DESCRIPTION

Figure 1:
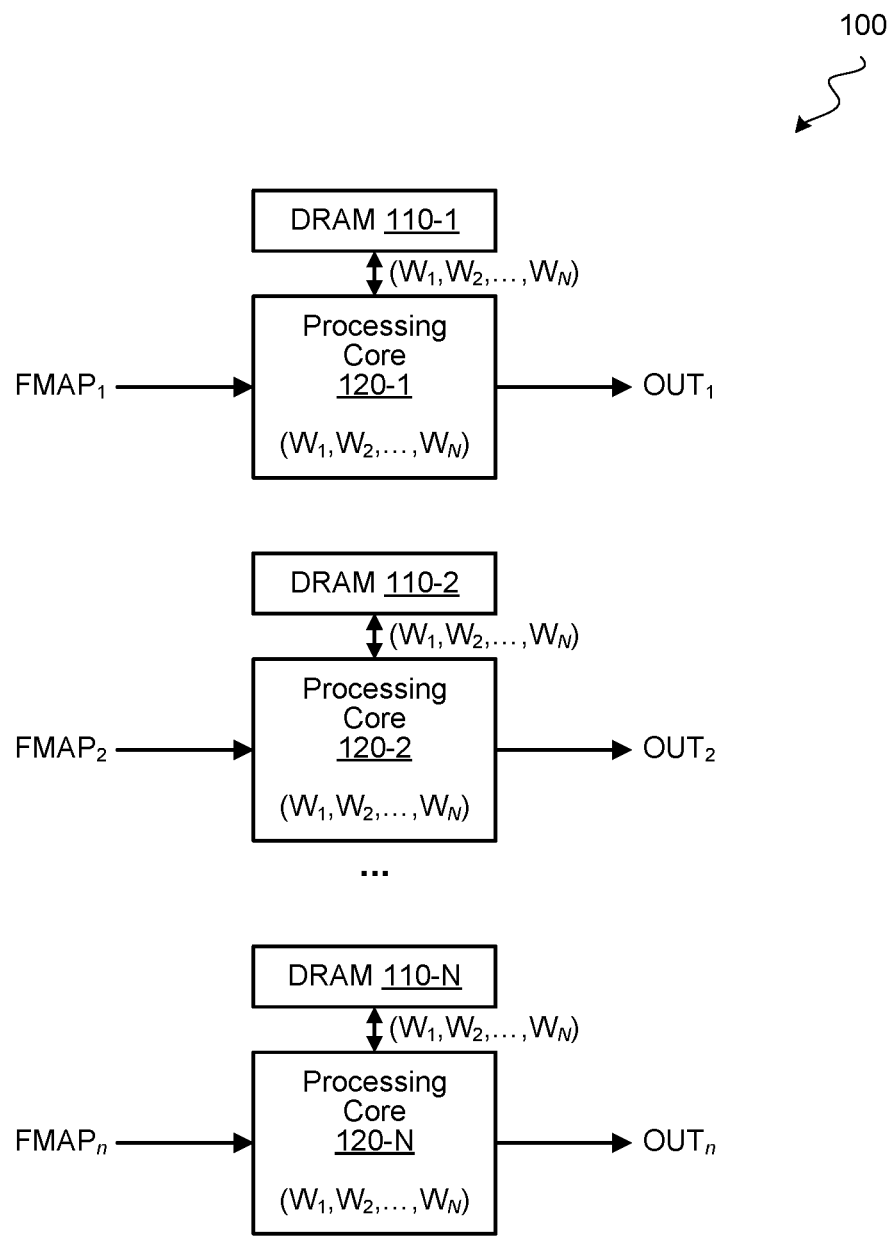
FIG. 1 illustrates a block diagram of an example of a processing system implementing data parallelism.

As neural networks are deployed to perform more and more complex tasks, the computational demands of neural networks have grown exponentially. Some applications such as natural language processing and autonomous navigation may require almost instantaneous inference results with minimal latency and high throughput. Most processing integrated circuit devices such as a processor and even specialized accelerators such as graphics processing units (GPUs), tensor processing units (TPUs), neural network processors, etc. may lack sufficient on-chip memory to simultaneously store the vast number of weights used by a neural network model on a single chip. As a result, executing the neural network model may require running the neural network model in a piecemeal fashion in which computations are performed using a subset of weights, and as the computations progress, additional weights are retrieved from system memory to allow the computations to continue. In some applications, the storage size of all the weights used by a neural network model can be hundreds of times greater than the capacity of the on-chip memory. Accessing system memory hundreds of times during one pass of executing the model can be a significant bottleneck that creates prolonged latencies to hinder practical usage of the neural network.

The techniques disclosed herein can partition a neural network model for serial execution across multiple processing cores in a pipelined fashion. Because different processing cores are tasked with performing different sets of computations for the different partitions of the neural network model, it is not necessary for each processing core to access all of the weights used by the neural network model. As a result, the set of weights used by the neural network model can be split up amongst the processing cores to reduce the number of accesses to system/off-chip memory. In some instances, if a sufficient number of processing cores are available, all of the weights of the neural network model can be cached locally across the multiple processing cores to eliminate accesses to system/off-chip memory for weights retrieval in the midst of execution.

In a pipelined or serial execution flow, the throughput can be limited by the slowest stage or partition. As such, balancing the execution latencies of the partitions amongst the processing cores can improve the overall throughput. In addition to partitioning a neural network model for serial execution, the techniques disclosed herein can also make optimization adjustments to the partitions to achieve more balanced execution latencies between processing cores. In addition to considering the amount of compute performed by each partition, the optimization techniques also consider the number of weights used by a partition and the sizes of tensors transferred between partitions to yield a more accurate estimation of the execution latency. Consideration of the number of weights and transfer size also provides additional flexibility of what adjustments can be made to optimize the partitions.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

To improve throughput, multiple processing integrated circuit devices (e.g., processing cores) can be used together to execute a neural network. For instance, the same neural network model can be loaded into each processing core for execution in parallel. Each processing core can be provided with a different set of input data or feature maps to process as much input data as possible. FIG. 1 illustrates an example of such a system 100 that implements data parallelism to improve throughput. As shown in FIG. 1, system 100 may include multiple processing cores 120-1 to 120-N. Each processing core can be a processor, GPU, TPU, neural network processor, or other types of acceleration or processing circuits. Processing core 120-1 can perform computations on feature map input $FMAP_1$, while processing core 120-2 is performing computations on feature map input $FMAP_2$, processing core 120-N is performing computations on feature map input $FMAP_n$, and so on. Because each processing core is performing computations on a different set of feature map inputs in parallel, the total throughput of system 100 scales with the number of processing cores.

Although such implements may alleviate some of the throughput limitations of using a single processing unit, each of the processing cores 120-1 to 120-N may not have sufficient on-chip memory to simultaneously store all of the weights used by the neural network model. For example, if the neural network model uses N sets of weights {$W_1$, $W_2$, ..., $W_N$}, and the on-chip memory of each processing core is limited to storing one set of weights at one time, execution of the neural network model will incur system memory access latencies to swap out each set of weights as needed. In other words, as computations in each processing core reach a point where the next set of weights is needed, the processing core will have to read from system memory (e.g., dynamic random access memory devices DRAM 110-1 to 110-N) to access the next set of weights before computations can continue. Although DRAMs 110-1 to 110-N are shown as separate memories, processing cores 120-1 to 120-N can also share one or more DRAM memories. Because accessing off-chip memory is slow as compared to the compute latency in the processing core, the system memory accesses to retrieve weights in the midst of execution become the bottleneck of the system.

Figure 2:
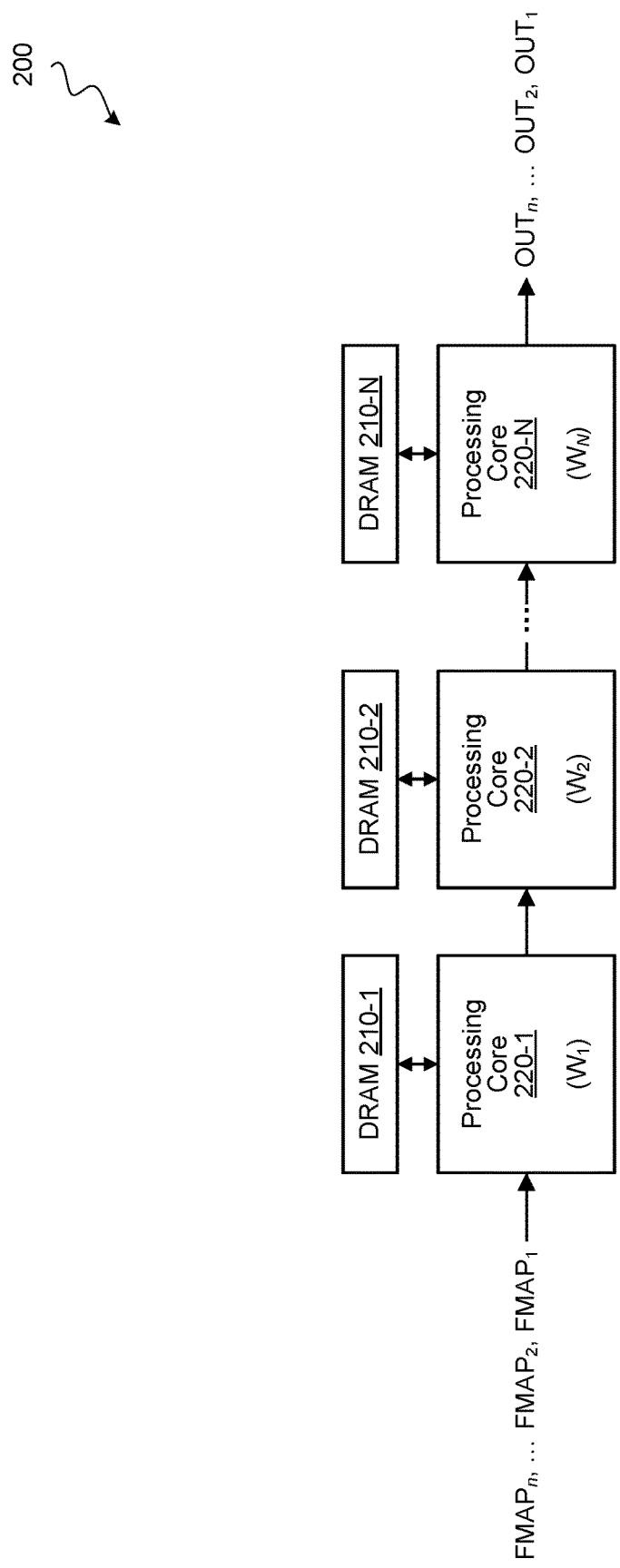
FIG. 2 illustrates a block diagram of an example of a processing system implementing pipelined execution flow.

FIG. 2 illustrates an example of a system 200 that implements a pipelined architecture to improve both throughput and latency. Similar to system 100, system 200 includes multiple processing cores 220-1 to 220-N. However, instead of having each of the processing cores 220-1 to 220-N execute the full neural network model, the neural network model is partitioned into N number of partitions with each processing core executing one of the partitions. The feature map inputs $FMAP_1$ to $FMAP_n$ are inputted serially, and each processor core generates intermediate results that are transferred to the next sequential processor core for further processing until the final output is generated by the last processing core 220-N. Because each processing core is tasked with performing a subset of the computations, each processing core only uses a portion of the overall weights of the neural network model.

For example, if N number of processing cores are available as shown, processing core 220-1 may only need access to weights $W_1$, processing core 220-2 may only need access to weights $W_2$, processing core 220-N may only need access to weights $W_N$, and so on. Weight values can be preloaded onto the processing cores before the feature map input data is fed into the system. As such, system memory accesses in the midst of execution can be eliminated all together because the weights used by each processing core can be locally cached at the start of execution in the corresponding processing core. Such a pipelined implementation can yield better latency as well as overall throughput than data parallel systems such as system 100. In some scenarios, there may be only a limited number of processing cores available. As such, each processing core may still need to access system memory to retrieve additional weights during execution. Nevertheless, even under such scenarios, the number of system memory accesses are still reduced to improve overall latency and throughput of the system.

Ideally, each processing core should incur the same amount of execution latency to avoid the situation where a processing core is idle waiting for the data from a previous processing core. However, most neural network models are not designed symmetrically such that each layer and each node perform the same amount of compute, use the same number of weights, and output the same amount of data. In other words, the amount of compute, the number of weights, and the amount of input/output (I/O) transfer can vary greatly for different nodes or different layers of a neural network model. This can complicate the task of partitioning the neural network model evenly across the multiple processing cores. For example, a compiler may be able to estimate the amount of compute performed for each node of a neural network and partition the nodes such that each processing core performs about the same amount of compute. However, this may not always equate to similar execution latencies amongst the processing cores, because the computations performed by a processing core may require more weight values than another processing core. This may result in additional latencies incurred by a processing core to access system memory for additional weights, while the other processing core need not perform such accesses. Furthermore, differences in the number of tensors and/or tensor sizes that are transferred between processing cores can also cause imbalance to the execution latencies, because additional clock cycles may be needed to transfer larger amounts of data across the interface between processing cores.

To assist with the partitioning process, a neural network model can be represented as a directed acyclic hypergraph by a compiler. A directed acyclic hypergraph may have the property that the output of a node does not feedback to a previous node. In other words, a directed acyclic hypergraph may not contain any closed loops. A directed acyclic hypergraph differs from a directed acyclic graph in that a source node can provide an output to multiple target nodes. Most architectures of neural network models lend themselves to readily be represented as a directed acyclic hypergraph.

Figure 3:
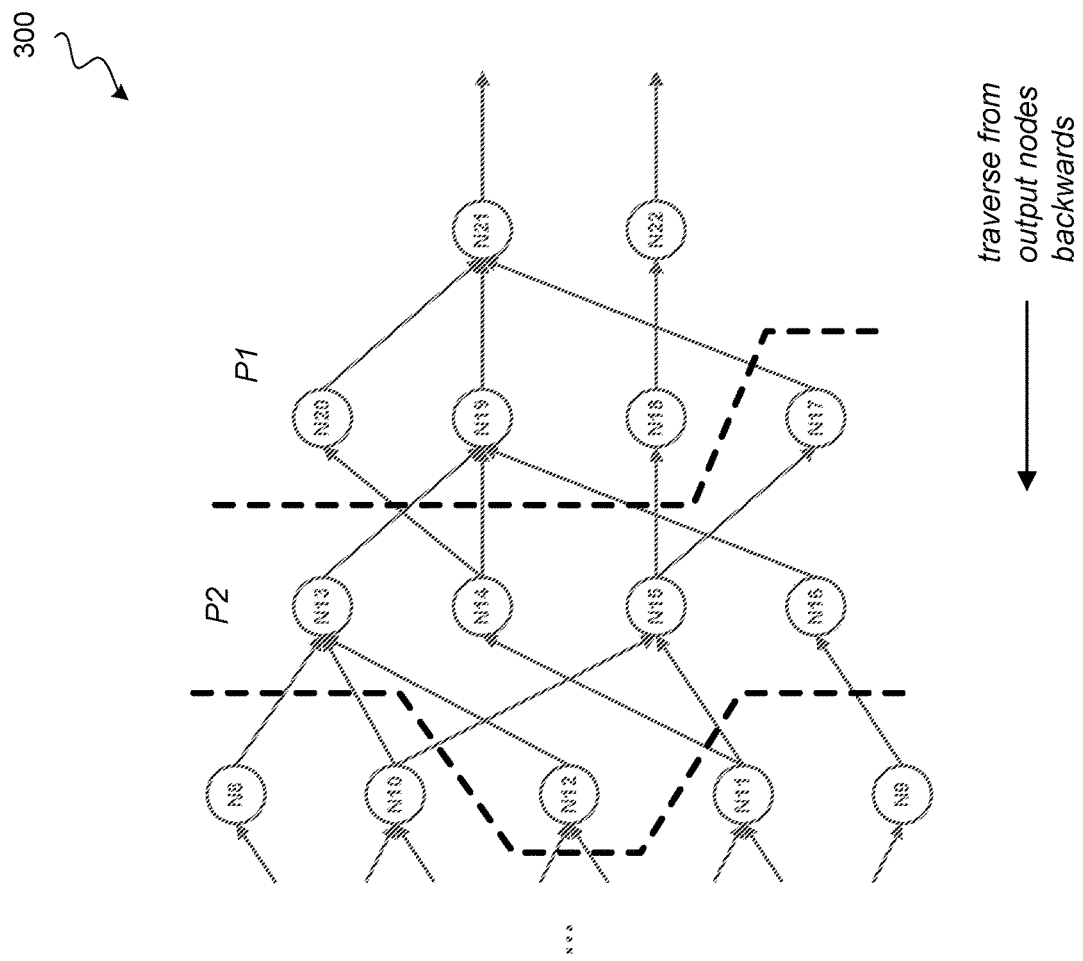
FIG. 3 illustrates a conceptual diagram of an example of performing an initial partitioning of a neural network model.
Figure 3:
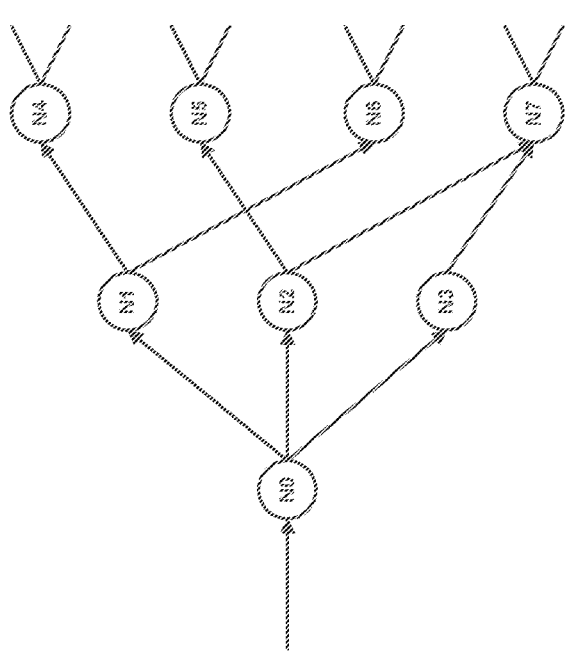

FIG. 3 illustrates an example of a neural network model 300 that is represented as a directed acyclic hypergraph. Neural network model 300 contains multiple nodes N0 to N22 (and additional nodes not shown) that are connected by edges. Each node represents a set of computations that are performed with a set of weights. Different nodes may perform different amounts of compute, and may use a different number of weights. Furthermore, different nodes may have different input tensor size and/or output tensors size, and the input and output tensor sizes for a given node can also differ, depending on the computations being performed by the node.

Input data is fed to node N0. N0 performs a set of computations on the input data using a set of weights, and provides the intermediate output to nodes N1, N2, and N3. Each of nodes N1, N2, and N3 performs a respective set of computations on the intermediate output from node N1 to generate respective sets of intermediate outputs that are fed to the next set of nodes, and so on. Nodes N21 and N22 are the output nodes of the neural network model that provide the final output of the computations. In some implementations, each level of nodes may represent a layer of the neural network model. For example, node N0 may form the input layer, nodes N1, N2, and N3 may form the first intermediate layer, nodes N4, N5, N6, and N7 may form the second intermediate layer, and so on. Nodes N21 and N22 may form the output layer of the neural network model. Although only 22 nodes are shown, it should be understood that fewer or greater number of nodes can be implemented.

A compiler may estimate the compute load of each node based on the computations performed for the node. In some implementations, this estimation can be based on the hardware architecture of the target processing integrated circuit device that the neural network model is intended to be executed on. The structure of neural network model 300 can be stored as a set of nodes, and a set of edges each connecting a source node to a target node. Each node can be associated with the number of compute clock cycles to perform the computations for the node and the number of weights used by the node. Each edge can be associated with the tensor size being transferred on that edge. In some implementations, a table or other data structure can be used to store this information.

During an initial phase of the partitioning process, the compiler may start at the output nodes (e.g., nodes N21 and N22) and traverse backwards from the output towards the input to aggregate the amount of compute load for each traversed node. When the aggregated amount of compute load reaches a compute threshold, a partition boundary can be created to form a partition of neural network model 300. By way of example, referring to FIG. 3, a first partition P1 is formed with nodes N22, N21, N20, N19, and N18 because the aggregated compute load of these nodes reached a compute threshold. Continuing to traverse backwards, a second partition P2 is formed with nodes N17, N16, N15, N14, N13, and N12 because the aggregated compute load of these nodes reached a compute threshold. In this manner, an initial partitioning of neural network model 300 can be performed. It should be noted that the number of nodes per partition may differ because the amount of compute for each node can be different.

In some implementations, the compute threshold used for the initial partitioning can be based on the hardware architecture of the target processing integrated circuit device that the neural network model is intended to be executed on. For example, if a neural network processing core can perform M number of computations per clock cycle, then that number can be used as a basis to derive the compute threshold. In this manner, the optimal number of neural network processing cores for executing the particular neural network model can be determined. In some implementations, if the number of processing integrated circuit devices or processing cores that can be used to execute the neural network model is limited or is known, then the compute threshold can be determined as the total compute load of the neural network model divided by the number of processing integrated circuit devices or processing cores. For example, if it is known that four processing cores will be used, then the compute threshold can be determined as the total compute load of the neural network mode divided by four.

Figure 4:
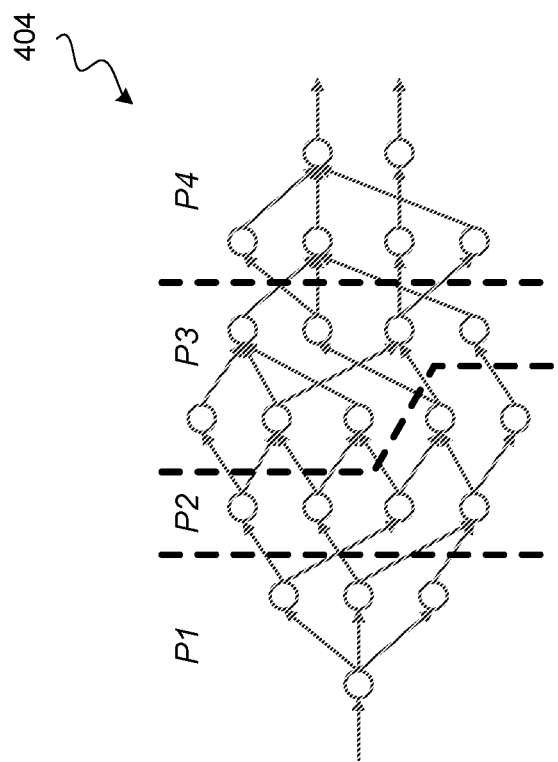
FIG. 4 illustrates a conceptual diagram of another example of performing an initial partitioning of a neural network model.
Figure 4:
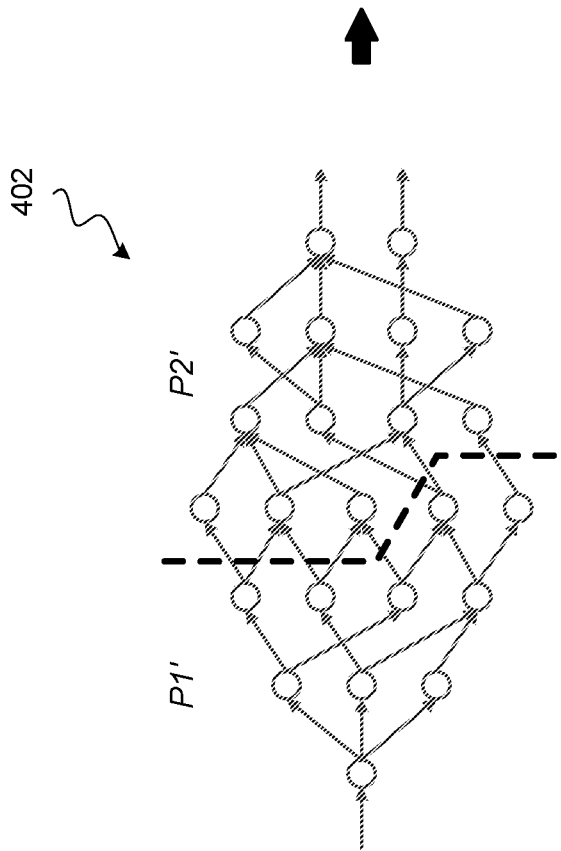

FIG. 4 illustrates another example of performing an initial partitioning of a neural network model. In some implementations, instead of traversing backwards from the output nodes, the neural network model can be partitioned initially by hierarchically dividing the directed acyclic hypergraph based on the compute load of the nodes. For example, during the first phase 402 of the initial partitioning, the neural network model can be divided into two halves P1' and P2' based on the compute load of the nodes. During a second phase 404 of the initial partitioning, the two halves P1' and P2' are further divided by half based on the compute load to generate partitions P1, P2, P3, and P4. In some implementations, the hierarchical division can be performed based on the number of processing integrated circuit devices or processing cores that will execute the neural network model. For example, if the number of processing cores to be used is 6, then the hierarchically dividing can first divide the directed acyclic hypergraph by 3 and then by 2, or vice versa.

After partitioning the neural network model (e.g., represented as a directed acyclic hypergraph) into a number of partitions corresponding to the number of processing integrated circuit devices or processing cores that will be used, an execution latency can be calculated for each partition. It should be noted that each partition itself can be represented as a corresponding directed acyclic sub-hypergraph of the directed acyclic hypergraph. The execution latency of a partition may include three components: the compute latency, the weight loading latency, and the I/O transfer latency.

The compute latency of a partition can be the total number of compute clock cycles to perform computations for the nodes in the partition. In some implementations, this can be the sum of the compute clock cycles to perform computations for each node in the partition. The compute clock cycles to perform computations for a node can be an estimation provided by a compiler for the hardware architecture of the target processing integrated circuit device. In some implementations, the neural network model can be executed on the actual hardware to obtain a latency measurement for each node, and the actual measured latency can be used to compute the total number of compute clock cycles for a partition.

The weight loading latency of a partition can be the total number of weight loading clock cycles for loading weights used by the nodes in the partition during execution of the neural network model. The number of weight loading clock cycles can be computed based on the total number of weights used by the nodes in the partition, the size or capacity of the on-chip memory (e.g., cache memory) of the processing integrated circuit device or processing core allocated for weights storage, and the system memory access latency (e.g., DRAM interface bandwidth, number of clock cycles to access DRAM, etc.). It should be noted that because the weights can be preloaded before feeding the neural network model with input data, the number of weight loading clock cycles for a partition can be zero when the number of weights used by the partition is within the storage capacity of the weight cache memory of the processing integrated circuit device or processing core.

For example, if the weight storage capacity of the on-chip cache memory allocated for storing weights can store up to 2048 number of weights, and the nodes in the partition uses 1664 number of weights, then the weight loading latency of the partition is zero because all 1664 number of weights can be cached locally, and it is not necessary to access system memory to obtain additional weights during execution. Under this example, the partition will not incur any weight loading latency until the number of weights used by a partition exceeds 2048. Thereafter, the number of weight loading clock cycles can be based on the system memory bandwidth and/or memory access latency for loading the number of weights in excess of 2048.

The I/O transfer latency of a partition can be the total number of data transfer clock cycles to output tensor data from the partition. In some implementations, the latency cost of transferring data between partitions can be attributed to the source node. Hence, the I/O transfer latency can be computed based on the number of tensors being outputted at a time from a partition, the size of the tensors, and the data transfer bandwidth of the interface between the processing integrate circuit devices or processing cores. It should be noted that when a source node from one partition outputs a tensor to two target nodes in the next partition, the tensor is counted once for determining the data transfer clock cycles even though there are two edges from the source node to the two target nodes. The tensor is only counted once because the tensor is transmitted only once across the partitions.

Accordingly, the execution latency of a partition can be computed by aggregating the compute clock cycles to perform computations in the partition, and the weight loading clock cycles determined based on the number of weights used in the partition. The data transfer clock cycles to output tensor data from a partition is also considered. Minimizing the data transfer clock cycles generally reduces the overall latency of the system. In some scenarios, the execution latencies computed for each partition can be different from each other because the initial partitioning is done at the node level, and may not have accounted for other contributing factors such as I/O transfer latency. The execution latencies computed for each partition can be stored in a table or other data structure for reference by a compiler when making additional adjustments or optimizations to the partitions.

Figure 5:
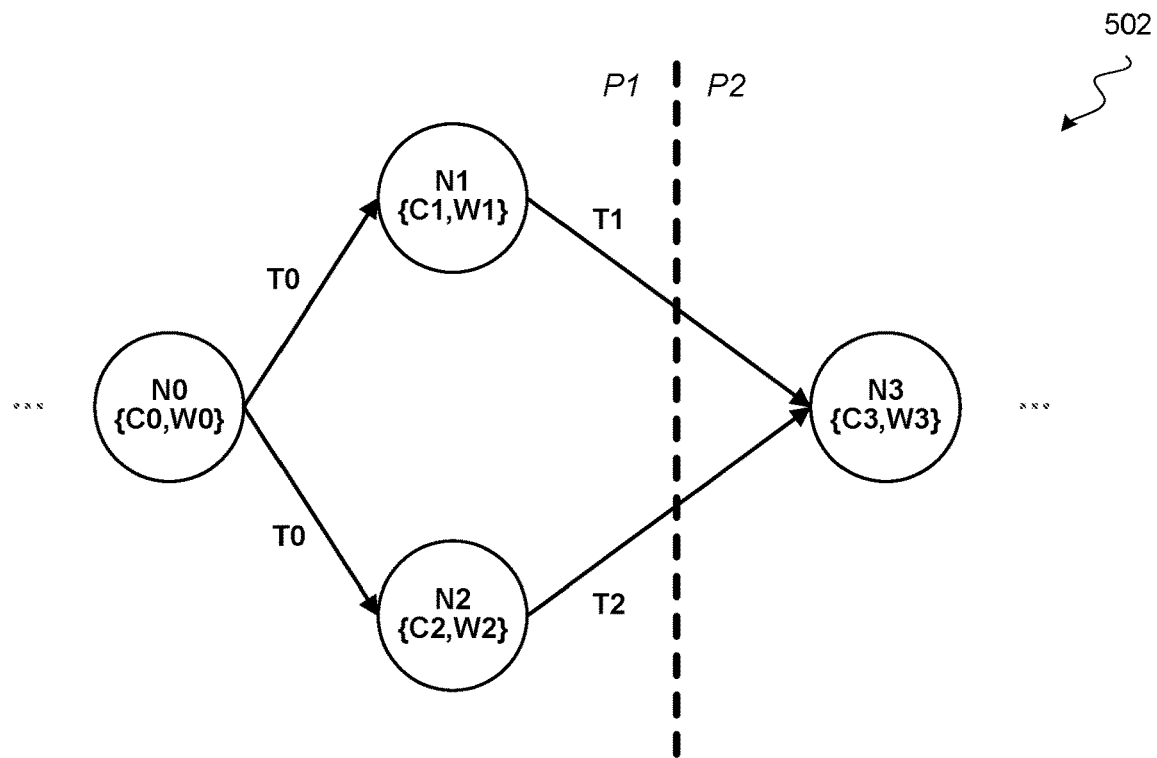
FIG. 5 illustrates a conceptual diagram of moving a node from one partition to another.
Figure 5:
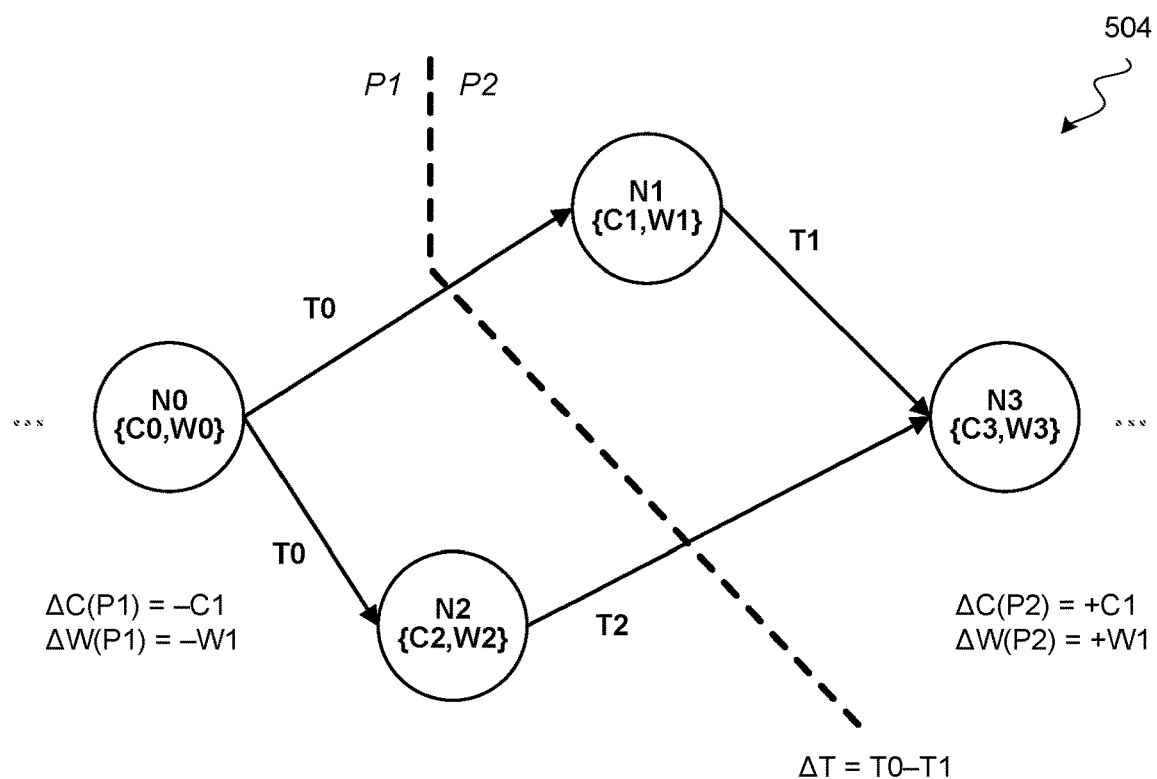

FIG. 5 illustrates an example of a partition adjustment being made to a neural network model. The initial partitioning 502 includes nodes N0, N1, and N2 in partition P1, and node N3 in partition P2. Although only four nodes are shown in FIG. 5 for illustrative purposes, it should be understood that a neural network model and its partitions can include other number of nodes and edges. As mentioned above, each node is associated with a number of compute clock cycles to perform computations for the node and the number of weights used by the node. Hence, in the example shown, node N0 incurs C0 number of compute clock cycles using W0 number of weights, node N1 incurs C1 number of compute clock cycles using W1 number of weights, node N2 incurs C2 number of compute clock cycles using W2 number of weights, and node N3 incurs C3 number of compute clock cycles using W3 number of weights. Each edge connecting the nodes is also associated with a data transfer size. For example, node N0 may output a tensor of size T0 to both nodes N1 and N2, node N1 may output a tensor of size T1 to node N3, and node N2 may output a tensor of size T2 to node N3.

Suppose the execution latencies computed for the initial partitioning 502 indicates that partition P1 has a longer execution latency than partition P2. Thus, it may be beneficial to adjust the partitions to achieve a more balanced execution latencies between P1 and P2. Nodes N1, N2, and N3 are along the partition boundary separating partition P1 and partition P2, and thus these nodes can be candidates for moving from one partition to the other to balance the execution latencies.

The initial partitioning 502 can be adjusted by considering a move of node N1 from partition P1 to partition P2. Referring to FIG. 5, the adjusted partitioning 504 after considering such a move now has nodes N0 and N2 in partition P1, and nodes N1 and N3 in partition P2. The I/O transfer latency gain of such a move can be determined as the data transfer clock cycles corresponding to the change in tensor size of $\Delta T=T0-T1$, because partition P1 no longer has to transfer a tensor of size T1 to partition P2, but now has to transfer a tensor of size T0 to partition T2. The change in the execution latencies within the individual partitions can be determined as follows. The change in the compute clock cycles of partition P1 is $\Delta C(P1)=-C1$, because partition P1 has less compute to perform after moving node N1 to partition P2. The change in the number of weights of partition P1 is $\Delta W(P1)=-W1$, because partition P1 no longer uses the W1 number of weights after moving node N1 to partition P2. The net change in clock cycles of partition P1 can then be computed from these individual changes in compute clock cycles and the number of weights used. It should be noted that although partition P1 is using less weights, the weight loading clock cycles of partition P1 may not change at all if partition P1 is already using fewer number of weights than the cache capacity before moving node N1. In any event, partition P1 can reduce the compute clock cycle by C1 if node N1 is moved from partition P1 to partition P2. The net change in clock cycles can then be used to determine the execution latency of partition P1 if node N1 is to be moved from partition P1 to partition P2.

Similarly, the adjustment to the execution latency within partition P2 of moving node N1 can be determined. The change in the compute clock cycles of partition P2 is $\Delta C(P2)=+C1$, because partition P2 has more compute to perform after moving node N1 to partition P2. The change in the number of weights of partition P2 is $\Delta W(P2)=+W1$, because partition P2 now uses an additional W1 number of weights after moving node N1 to partition P2. The net change in clock cycles of partition P2 can then be computed from these individual changes in compute clock cycles and the number of weights used. It should be noted that although partition P2 is using more weights, the weight loading clock cycles of partition P2 may not change at all if the number of weights used by partition P2 after moving node N1 remains below the cache capacity. In any event, partition P2 increases its compute clock cycle by C1 if node N1 is moved from partition P1 to partition P2. The net change in clock cycles can then be used to determine the execution latency of partition P2 if node N1 is to be moved from partition P1 to partition P2.

A similar analysis of the I/O transfer latency gain and the change in execution latencies of partitions P1 and P2 can be performed for each of the nodes along the initial partition boundary 502. Thus, referring to the initial partition 502 of FIG. 5, a similar analysis is performed to consider moving node N2 from partition P1 to partition P2, and moving node N3 from partition P2 to partition P1. When all nodes along a partition boundary has been considered, the node provides the largest improvement in reducing an amount of data being transferred between the partitions and in balancing execution latencies of the partitions is selected, and moved across the partition boundary. It should be noted that a node can be moved if the move does not violate the directed acyclic hypergraph property of the partitions, and if that node is not the only node of a partition.

If there are no moves that both reduces the I/O transfer latency and the difference in execution latencies between the partitions, then a move that improves the I/O transfer latency but does not worsen the balance of execution latencies is selected, or a move that does not worsen the I/O transfer latency but improves the balance of execution latencies is selected. In some implementations, if the sum of the total compute clock cycles of the two partitions, the total number of weight loading clock cycles of the two partitions, and the number of data transfer clock cycles between the two partitions is less after the move than the total before the move, then the move is performed to adjust the partition boundary. Once a node has been moved from a source partition to a target partition, the process can be repeated for the new partition boundary. This process can be iteratively performed until no further improvement can be made to reduce the I/O transfer latency or to balance the execution latencies.

Figure 6:
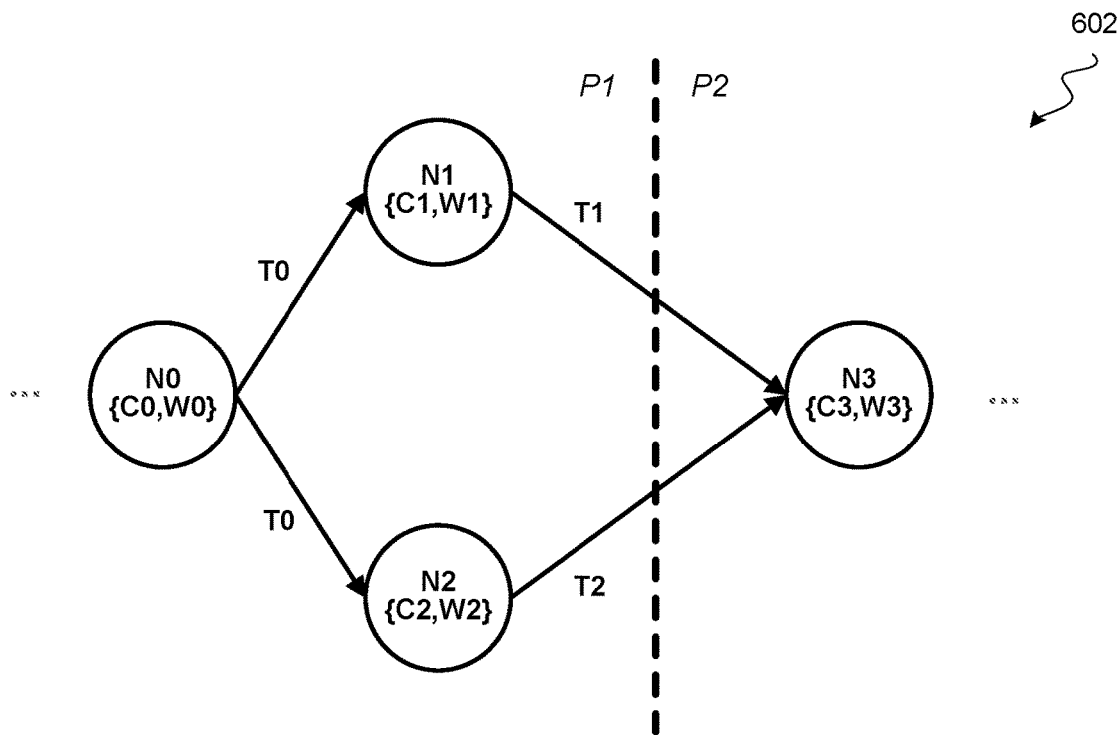
FIG. 6 illustrates a conceptual diagram of moving a portion of a node from one partition to another.
Figure 6:
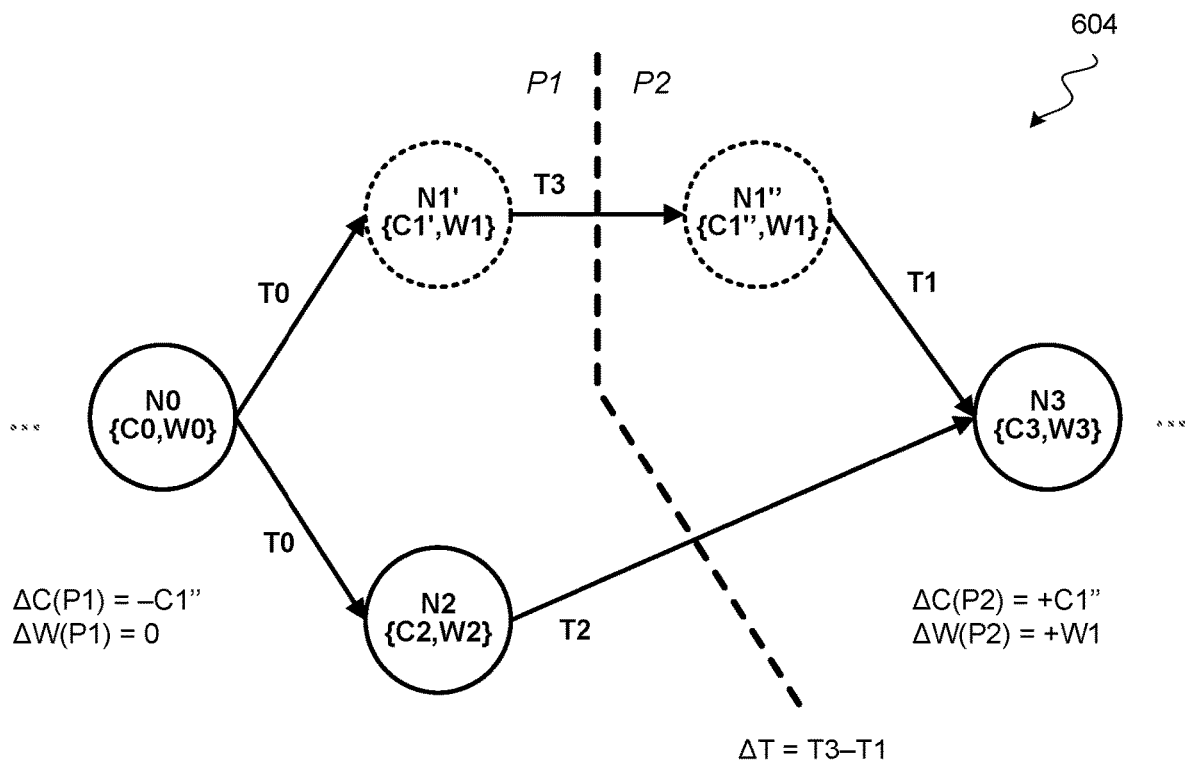

FIG. 6 illustrates another example of a partition adjustment being made to a neural network model. In contrast to FIG. 5, the adjustment in FIG. 6 does not move an entire node from one partition to another, but instead moves only a portion of a node. This may allow finer adjustments to be made to the execution latencies of the partitions and I/O transfer latency, which may not have been possible if the adjustments are only made at the node level. The initial partitioning 602 is the same as FIG. 5, and hence a description of which need not be repeated.

Referring to the adjusted partitioning 504, instead of moving the entirety of node N1 from partition P1 to partition P2, only a portion of node N1 is moved. In other words, only a portion of the computations performed by node N1 is moved into partition P2. Hence, the compute clock cycles of node N1 are split into C1' and C1", where C1=C1'+C1". Although the amount of computations are now shared by the two partitions, the same number of weights may be needed for both portions of the computations. In other words, partition P1 may still need to use the W1 number of weights for the C1' computations, and partition P2 may also need to use the W1 number of weights for the C1' computations. As such, the W1 number of weights are replicated from partition P1 into partition P2. Although the number of weights used by both partitions have now increased because the W1 number of weights have been replicated in partition P2, this may not necessarily increase the weight loading clock cycles of partition P2 because the number of weights used by partition P2 after the move may remain below the cache capacity. Another difference from FIG. 5 to note is that the data transfer latency now takes into account the internal tensor size T3 used by node N1.

The I/O transfer latency gain of such a move can be determined as the data transfer clock cycles corresponding to the change in tensor size of $\Delta T=T3-T1$, because partition P1 no longer has to transfer a tensor of size T1 to partition P2, but now has to transfer a tensor of size T3 to partition T2. The change in the execution latencies within the individual partitions can be determined as follows. The change in the compute clock cycles of partition P1 is $\Delta C(P1)=-C1'$, because partition P1 has less compute to perform after moving C1" amount of compute from node N1 to partition P2. The change in the number of weights of partition P1 is $\Delta W(P1)=0$, because partition P1 still uses the same number of weights. The net change in clock cycles of partition P1 can then be computed from these changes in compute clock cycles and the number of weights used.

The adjustment to the execution latency of partition P2 of partially moving node N1 can be determined in a similar manner. The change in the compute clock cycles of partition P2 is $\Delta C(P2)=+C1'$, because partition P2 has more compute to perform. The change in the number of weights of partition P2 is $\Delta W(P2)=+W1$, because partition P2 now uses an additional W1 number of weights. The net change in clock cycles of partition P2 can then be computed from these changes in compute clock cycles and the number of weights used.

Upon determining the net change of the two partitions (which may not be equal in magnitude to each other), a determination can be made as to whether partially moving node N1 improves the balance of execution latencies and/or reduces the I/O transfer latency. In some implementations, the portion of compute in node N1 being moved can be tuned to increase or decrease C1' and C1" such that the net gains of the two partitions can be made to match the difference in the execution latencies of the initial partitioning.

Figure 7:
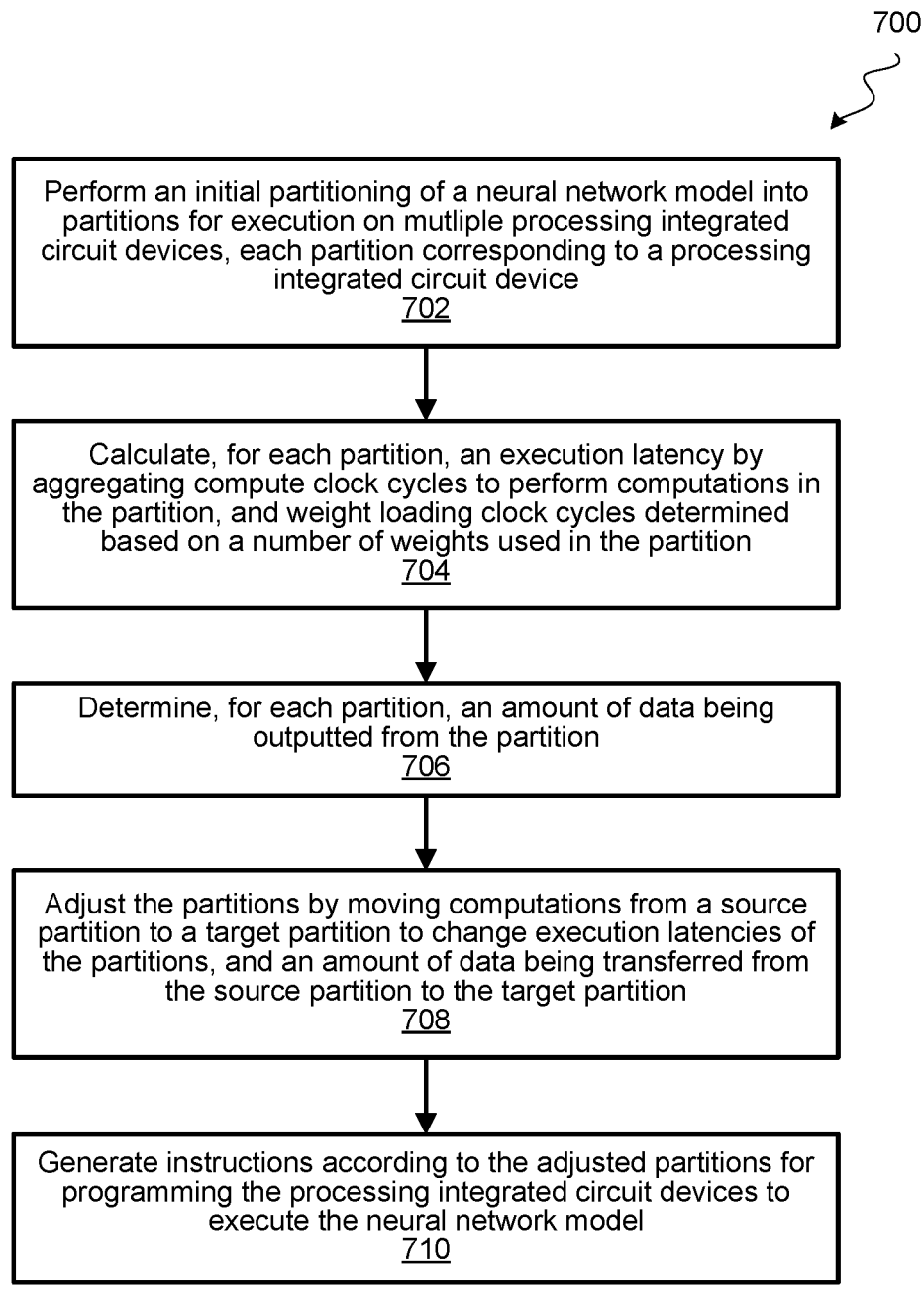
FIG. 7 illustrates a flow diagram of an example of a process for partitioning a neural network model.

FIG. 7 illustrates a flow diagram of a process 700 for partitioning a neural network model for execution on multiple processing integrated circuit devices (e.g., multiple processing cores). Process 700 can be performed, for example, by a compiler that interprets programming code to describe a neural network model, and translates the programming code into machine instructions for execution on hardware such as the processing integrated circuit devices. In some implementations, process 700 can be implemented on a computer-readable medium that is executable by a processor of a computing system to compile the programming code of the neural network model for loading onto the processing integrated circuit devices for execution.

Process 700 may initially obtain a description of the neural network model, and generate a representation of the neural network model as a directed acyclic hypergraph having nodes and edges connecting the nodes. The description of the neural network model can be, for example, in a programming language such as Java, C++, or Tensorflow, among many other examples. A representation of the directed acyclic hypergraph can be generated based on the computations and data flow provided in the description of the neural network model.

Process 700 may begin at block 702 by performing an initial partitioning of the neural network model into partitions for execution on multiple processing integrated circuit devices, in which each partition corresponds to a processing integrated circuit device. As mentioned above, the neural network model can be represented as a directed acyclic hypergraph having nodes and edges connecting the nodes. Each partition can also be represented as a corresponding directed acyclic sub-hypergraph of the directed acyclic hypergraph. It should also be noted that the partitions themselves can form a directed acyclic hypergraph. In other words, each partition can represent a node in a directed acyclic hypergraph, where partition $P_i$ can output to partition P1 when j>i ($P_j$ follows $P_i$), but partition $P_i$ does not output to partition $P_k$ when k<i ($P_k$ precedes $P_i$). The initial partitioning can be performed, for example, by traversing backwards on the directed acyclic hypergraph starting from output nodes of the directed acyclic hypergraph, and sequentially setting a partition boundary when an aggregated compute load of traversed nodes reaches a compute threshold. In some implementations, the initial partitioning can be performed by hierarchically dividing the directed acyclic hypergraph based on compute load of the nodes.

At block 704, process 700 calculates, for each partition, an execution latency by aggregating compute clock cycles to perform computations in the partition, and weight loading clock cycles determined based on a number of weights used in the partition. At block 706, process 700 determines, for each partition, the amount of data being outputted from the partition. In some implementations, the calculations can be performed using information about the nodes and edges captured from the description of the neural network model. For example, when parsing the description of the neural network model, a compiler may have stored the number of compute clock cycles for each node, the number of weights used by each node, and the tensor size being transferred on each edge in a table or other data structure. This information can be used to compute the execution latencies of the respective partitions. It should be noted that the total number of weight loading clock cycles for loading weights used by the nodes in the partition can be zero when the number of weights used by the partition is within a weight storage capacity of a cache memory of the processing integrated circuit device.

At block 708, the partitions can be adjusted or optimized by moving computations from a source partition to a target partition to change execution latencies of the partitions and/or the amount of data being transferred from the source partition to the target partition. For example, optimizing a partition may include iteratively performing for each node along a partition boundary the operations of determining whether moving a node or a portion of the node across the partition boundary from a source partition to a target partition improves a balance of execution latencies of the partitions and/or reduces an amount of data being transferred between the partitions. If such a move improves the balance of execution latencies and/or reduces an amount of data being transferred between the partitions, the node is moved and the execution latencies of the partitions and the amount of data being transferred across the partition boundary are recalculated. This optimization process can be iteratively performed to adjust the partition boundary until no further improvement to the balance of execution latencies or reduction in the amount of data being transferred can be made. It should be noted that a node or a portion of a node on one side of the partition boundary can be moved forward into the next partition, or a node or a portion of a node on the other side of the partition boundary can be moved backward into the previous partition. A move can be made as long as the properties of the directed acyclic hypergraph are maintained in each partition after the move.

By way of example, moving computations from a source partition to a target partition may involve moving an entire node from the source partition to the target partition. In such a scenario, the compute clock cycles attributed to the node is subtracted from the source partition, and added to the target partition. The number of weights attributed to the node is also subtracted from the source partition, and added to the target partition. A determination can then be made as to whether to adjust the weight loading clock cycles for each of the source partition and the target partition. Changing the number of weights does not necessary affect the weight loading clock cycles of a partition. For example, a determination can be made to not adjust the weight loading clock cycles for the target partition when the number of weights used by the target partition after moving the node is below a threshold corresponding to a weight cache memory capacity of the processing integrated circuit device of the target partition. A determination can also be made as to the change in the amount of data being transferred and whether to adjust the data transfer clock cycles for the source partition based on a difference between an input tensor size and an output tensor size of the node being moved.

In some instances, moving computations from a source partition to a target partition may involve moving a portion of a node from the source partition to the target partition. In such instances, moving the portion of the node may include replicating weights used by the node into the target partition, and increasing the number of weights used by the target partition without adjusting the number of weights used by the source partition. Such a move may not necessarily change the weight loading clock cycles for the source partition and the target partition.

Subsequent to performing block 708, the optimized partitions may each have a similar or same execution latency as the other partitions. Nevertheless, there can be a partition having a total number of compute clock cycles that is greater than another partition, while also having a total number of weight loading clock cycles that is less than the other partition. This is a result of the flexibility of the adjustments that can be made to fine-tune the balance of execution latencies by considering the amount of compute, weights, and I/O transfers.

At block 710, instructions for programming the processing integrated circuit devices to execute the neural network model can be generated according to the adjusted partitions. For example, the instructions being generated can be processor or machine instructions (e.g., assembly instructions) of an instruction set implemented by the architecture of the processing integrated circuit devices. The instructions may include instructions to perform matrix-multiplication operations, loading tensor data from memory-mapped locations, storing tensor data to memory-mapped locations, etc. In some implementations, the instructions for an individual processing integrated circuit device can be compiled into a binary file for loading onto that processing integrated circuit device, and each processing integrated circuit device may have its own binary file that contains instructions for the individual processing integrated circuit device.

Thereafter, the instructions corresponding to the neural network model can be loaded onto the processing integrated circuit devices according to the adjusted or optimized partitions, and the neural network model loaded onto the processing integrated circuit devices can be executed. For example, the balanced partitioning technique of process 700 was applied to a transformer-based encoder model used in natural language processing applications to determine the performance improvement as compared to data parallel systems. When the transformer-based encoder model was loaded onto a system with four processing cores, the balanced partitioning approach of process 700 provided about 1.2x reduction in latency and 1.2x increase in throughput over a data parallel implementation. When the transformer-based encoder model was loaded onto a system with sixteen processing cores, the balanced partitioning approach of process 700 provided about 2.4x reduction in latency and 1.8x increase in throughput. Data-parallel throughput scales linearly from four processing cores to sixteen processing cores, but latency remains the same and high. In contrast, the pipelined balanced partitioning implementation provides both better throughput and reduces the latency proportional to the number of processing cores.

Figure 8:
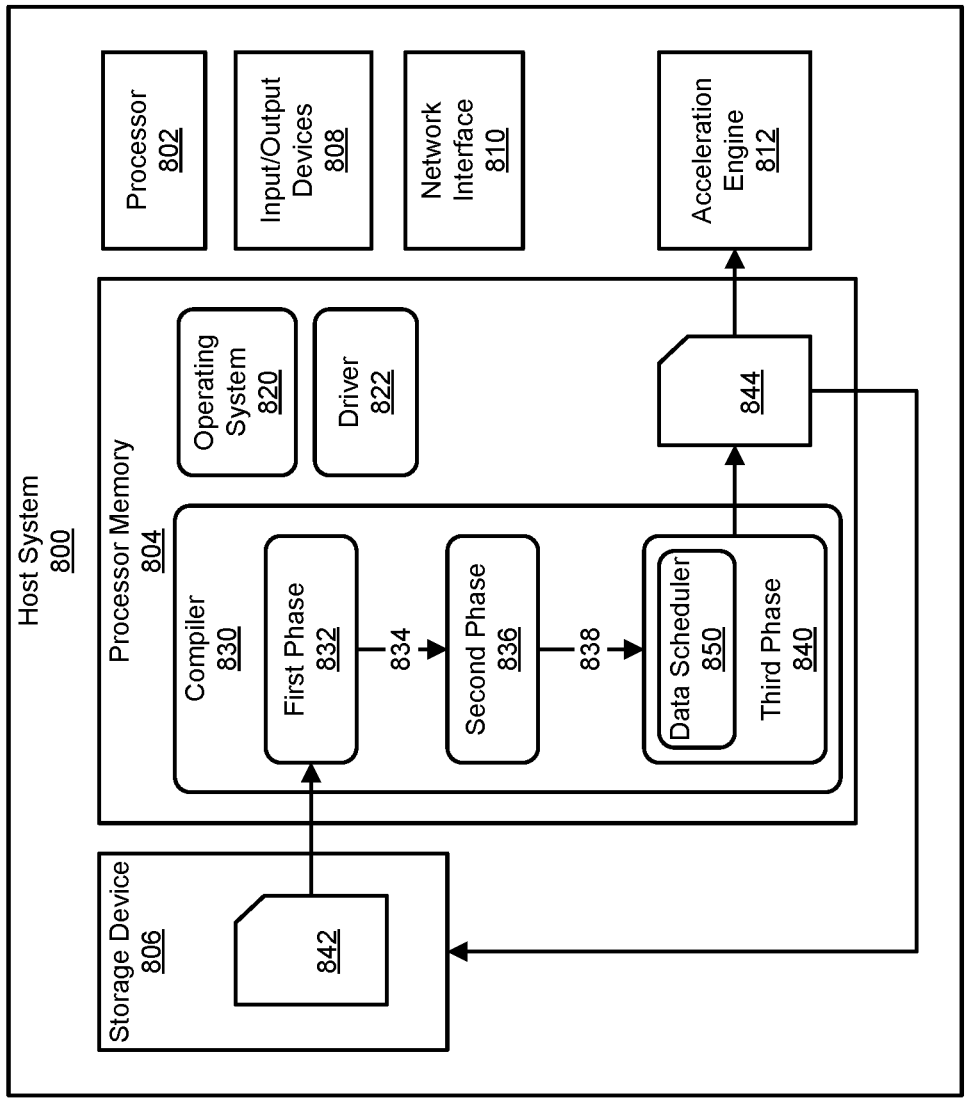
FIG. 8 illustrates a block diagram of an example of a compiler in a host system.

FIG. 8 includes a block diagram illustrating an example of a host system 800 on which a compiler 830, such as is described herein, can run. The illustrated host system 800 is an example of a computing device, and includes a processor 802, a processor memory 804, at least one storage device 806, various Input/Output (I/O) devices 808, and at least one network interface 810. In the example of FIG. 1, the host system 800 also includes an acceleration engine 812, which is an integrated circuit device that can accelerate certain operations or computations performed by the host system 800. In various examples, the host system 800 can be implemented as a server in a data center, a desktop computer, a laptop computer, a tablet computer, or a smartphone, among other examples. In some examples, operations or components discussed below as being performed or included in the host system 800 can be performed or included in other computer devices. For example, the compiler 830 can execute on the host system 800 while the acceleration engine 812 is located at a different host system.

The processor 802 is an integrated circuit device that can execute program code, in the form of instructions. The program code can be for various software applications or tools, such as an operating system 820 or the illustrated compiler 830. While the processor 802 is executing a program, the instructions for the program can be stored in the processor memory 804. The instructions can also be stored elsewhere, such as on the storage device 806, and can be loaded into the processor memory 804 when needed by the processor 802. The processor 802 can also use the processor memory 804 for temporary storage of other data on which the processor 802 is operating. In various examples, the processor memory 804 is a volatile memory type, such as a type of Random Access Memory, though non-volatile memory types can, alternatively or additionally, be used for the processor memory 804.

The storage device 806 is an example of a device that can include non-volatile memory. For example, the storage device 806 can be a magnetic disk drive, a solid state drive, or an optical drive, among other examples. The storage device 806 can further be non-transitory, such that program code and other data stored on the storage device 806 remains present when the storage device 806 is not powered on.

The storage device 806 is one example of a peripheral device, which are components that can be coupled to the host system 800 to add functionality to the host system 800. Other examples of peripheral devices include the Input/Output devices 808 and the network interface 810. The Input/Output devices 808 can include user input and output devices, such as keyboards, mice, touch screens, microphones, display screens, speakers, printers, and scanners, among other examples. The network interface 810, which can be implemented using a network interface card, can provide access to one or more networks. The network interface 810 can include, for example, a physical port for connecting a network cable and/or wireless antennas for communicating with Wi-Fi and/or cellular networks. The network interface 810 can also be described as an I/O device.

The acceleration engine 812 is also another type of peripheral device or I/O device. The acceleration engine 812 is a device that is purpose-built to perform certain operations that can be performed by the processor 802, but can be performed faster by the acceleration engine 812. For example, the acceleration engine 812 can be a neural network accelerator, and, as such, may be able to perform the large scale, parallel computations of a neural network more efficiently than when the computations are performed by the processor 802. As another example, the acceleration engine 812 can be a graphics processing unit (GPU), and may be optimized to perform the computations needed for graphics rendering. Other examples of devices that can be implemented by the acceleration engine 812 include cryptographic accelerators, compression and decompression accelerators, 3-D accelerators, regular expression accelerators, security accelerators, and others.

In various examples, the acceleration engine 812 can execute program code to perform certain operations. For example, when the acceleration engine 812 is a neural network accelerator, the acceleration engine 812 can be programmed to execute a particular neural network, such as one that performs image recognition or one that performs machine translation. As a further example, to support the execution of a neural network, the acceleration engine 812 can be programed to perform operations such as copying data for the neural network from processor memory 804 (for example) into the acceleration engine 812, copying input data for the neural network from processor memory 804 into the acceleration engine 812, and/or copying results from the acceleration engine 812 into the processor memory 804, among other examples.

To generate program code for the acceleration engine 812, in various examples, the host system 100 can execute the compiler 830. Compilers, in general, are software programs that translate program code written in a human-readable language into a format (e.g., machine instructions) that can be read and processed by an integrated circuit device. In the example of FIG. 8, the acceleration engine 812 is a neural network accelerator and the compiler 830 is for compiling a neural network description into instructions to be executed by the acceleration engine 812. When the acceleration engine 812 implements a different type of accelerator, another compiler can be used.

The compiler 830 can be activated, for example, when the operating system 820 receives keyboard, mouse, touchscreen, voice commands, or other inputs from the Input/Output devices 808. The inputs can further include parameters for the compiler 830, such as the input code 842 to compile and configuration options for the compilation process. Once the compiler 830 is activated, the processor 802 can load the instructions for the compiler 830 into the processor memory 804, and can execute the instructions.

In the example of FIG. 8, the compiler 830 includes a first stage 832, a second stage 836, and a third stage 840, which each perform different operations to produce compiled code 844. In other examples, the compiler 830 can combine the operations of the first stage 832, second stage 836, and/or third stage 840 into fewer stages, or can divide the operations of one of the stages into multiple stages.

The first stage 832 can receive and process input code 842. The input code 842 can describe a program in a high-level programming language, such as Java, C++, or Tensorflow, among many other examples. The input code 842 can describe, for example, steps to perform image recognition, speech recognition, machine translation, or other operations. The input code 842 can be obtained, for example, from the storage device 806. Alternatively, though not illustrated here, the input code 842 may be located in the processor memory 804 or can be obtained from a network location, using the network interface 810. Processing of the input code 842 can include sorting the operations described in the input code 842 into layers, where the outputs of one layer provide the inputs to a next layer. Processing can also include identifying steps to be performed by the processor 802, rather than by the acceleration engine 812. For example, the processor 802, through the execution of a driver 822, may need to perform steps such as configuring Direct Memory Access (DMA) descriptors for moving data into or out of the acceleration engine 812, among other examples.

The output 834 of the first stage 832 can be organized, for example, in the layers, nodes, and connections between nodes of a neural network. The second stage 836 can perform intermediate processing on this output 834. For example, the operations performed in any one layer, or at any one node in a layer, may be too many for the acceleration engine 812 to perform at the same time. The acceleration engine 812 may, for example, have a limited amount of locale storage space for the data needed for a computation, or the computations may be more than the acceleration engine 812 can perform at one time. In this example, the first stage 832 can break the operations of the layer or node down into smaller operations, which can fit into the acceleration engine's local memory and/or can fit into the computing capacity of the acceleration engine 812. Processing of the output 834 of the first stage 832 can include other steps, such as scheduling, or determining the order in which the acceleration engine 812 and/or processor 802 will perform operations, among other examples.

In various examples, the output 838 of the second stage 836 includes the various steps to be performed by components of the acceleration engine 812, in the order that the steps are to be performed. The output 838 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 840 can operate on the output 838 of the second stage 836, and perform various steps before producing the instructions that are to be executed by the acceleration engine 812. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 840 can include a data scheduler 850 to determine the order in which instructions are executed by the acceleration engine 812.

The output of the third stage 840 is compiled code 844, which may include machine instructions in binary format. In some examples, the compiled code 844 can be stored in the processor memory 804. Alternatively or additionally, the compiled code 844 can be copied to the storage device 806 or to a network location. As noted above, the acceleration engine 812 may be located at a different host system, in which case the compiled code 844 can be sent over the network interface 810 to the other host system.

In the example of FIG. 8, the host system 800 can be executing a driver 822, which can also be referred to as a device driver or runtime driver, that manages the acceleration engine 812. The driver 822 can provide an interface between applications executing on the host system 800 (or on another host system) and the acceleration engine 812. For example, the driver 822 can provide an Application Program Interface (API) that defines functions for feeding input data to the acceleration engine 812 and defining the operation to perform on the input data. In this and other examples, the driver 822 can configure the acceleration engine 812 to perform the operation. For example, the driver 822 can identify a neural network that the acceleration engine 812 is to execute, as well as the location in the processor memory 804 or on the storage device 806 where the compiled code 844 for the neural network is located. The driver 822 can further load into the acceleration engine 812 or cause the acceleration engine 812 to load the compiled code 844, can load or cause the acceleration engine 812 to load the input data on which the neural network is to operate, and/or can cause the acceleration engine 812 to being executing on the input data. Once the acceleration engine 812 has finished, the acceleration engine 812 can notify the driver 822, and the driver 822 can deliver a result back to the application that requested the result.

Figure 9:
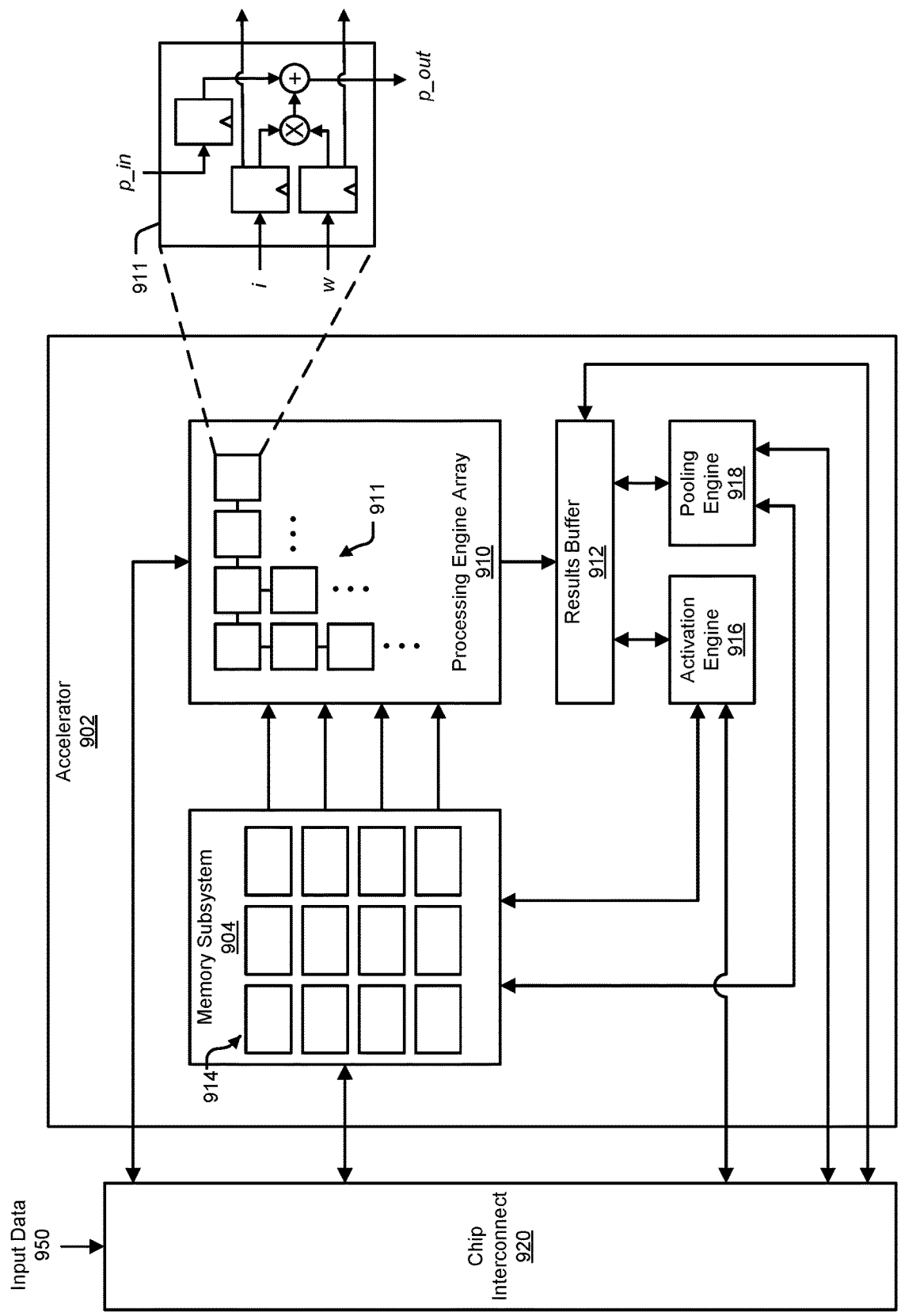
FIG. 9 illustrates a block diagram of an example of an integrated circuit device.

FIG. 9 is a block diagram illustrating an example of a processing integrated circuit device that can be used as a processing core. The example of FIG. 9 illustrates an accelerator 902. In various examples, the accelerator 902, for a set of input data (e.g., input data 950), can execute computations using a processing engine array 910, an activation engine 916, and/or a pooling engine 918. In some examples, the example accelerator 902 may be an integrated circuit component of a processor, such as a neural network processor. The processor may have other integrated circuit components, including additional accelerator engines.

In various implementations, the memory subsystem 904 can include multiple memory banks 914. In these implementations, each memory bank 914 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 914. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 904 can permit simultaneous access to the read or write channels of multiple memory banks. As another example, the memory subsystem 904 can include arbitration logic such that arbitration between, for example, the outputs of multiple memory banks 914 can result in more than one memory bank's output being used. In these and other examples, though globally managed by the memory subsystem 904, each memory bank can be operated independently of any other.

Having the memory banks 914 be independently accessible can increase the efficiency of the accelerator 902. For example, values can be simultaneously read and provided to each row of the processing engine array 910, so that the entire processing engine array 910 can be in use in one clock cycle. As another example, the memory banks 914 can be read at the same time that results computed by the processing engine array 910 are written to the memory subsystem 904. In contrast, a single memory may be able to service only one read or write at a time. With a single memory, multiple clock cycles can be required, for example, to read input data for each row of the processing engine array 910 before the processing engine array 910 can be started.

In various implementations, the memory subsystem 904 can be configured to simultaneously service multiple clients, including the processing engine array 910, the activation engine 916, the pooling engine 918, and any external clients that access the memory subsystem 904 over a communication fabric 920. In some implementations, being able to service multiple clients can mean that the memory subsystem 904 has at least as many memory banks as there are clients. In some cases, each row of the processing engine array 910 can count as a separate client. In some cases, each column of the processing engine array 910 can output a result, such that each column can count as a separate write client. In some cases, output from the processing engine array 910 can be written into the memory banks 914 that can then subsequently provide input data for the processing engine array 910. As another example, the activation engine 916 and the pooling engine 918 can include multiple execution channels, each of which can be separate memory clients. The memory banks 914 can be implemented, for example, using static random access memory (SRAM).

In various implementations, the memory subsystem 904 can include control logic. The control logic can, for example, keep track of the address spaces of each of the memory banks 914, identify memory banks 914 to read from or write to, and/or move data between the memory banks 914. In some implementations, memory banks 914 can be hardwired to particular clients. For example, a set of memory banks 914 can be hardwired to provide values to the rows of the processing engine array 910, with one memory bank servicing each row. As another example, a set of memory banks can be hard wired to receive values from columns of the processing engine array 910, with one memory bank receiving data for each column.

The processing engine array 910 is the computation matrix of the example accelerator 902. The processing engine array 910 can, for example, execute parallel integration, convolution, correlation, and/or matrix multiplication, among other things. The processing engine array 910 includes multiple processing engines 911, arranged in rows and columns, such that results output by one processing engine 911 can be input directly into another processing engine 911. Processing engines 911 that are not on the outside edges of the processing engine array 910 thus can receive data to operate on from other processing engines 911, rather than from the memory subsystem 904.

In various examples, the processing engine array 910 uses systolic execution, in which data arrives at each processing engine 911 from different directions at regular intervals. In some examples, input data can flow into the processing engine array 910 from the left and weight values can be loaded at the top. In some examples weights and input data can flow from the left and partial sums can flow from top to bottom. In these and other examples, a multiply-and-accumulate operation moves through the processing engine array 910 as a diagonal wave front, with data moving to the right and down across the array. Control signals can be input at the left at the same time as weights, and can flow across and down along with the computation.

In various implementations, the number of columns in the processing engine array 910 determines the computational capacity of the processing engine array 910, and the number of rows determines the required memory bandwidth for achieving maximum utilization of the processing engine array 910. The processing engine array 910 can have, for example, 64 columns and 428 rows, or some other number of columns and rows.

An example of a processing engine 911 is illustrated in FIG. 9 in an inset diagram. As illustrated by this example, a processing engine 911 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 911.

In the illustrated example, an input from above can include a partial sum, p_in, provided either from another processing engine 911 or from a previous round of computation by the processing engine array 910. When starting a computation for a new set of input data, the top row of the processing engine array 910 can receive a fixed value for p_in, such as zero. As illustrated by this example, i and w are multiplied together and the result is summed with p_in to produce a new partial sum, p_out, which can be input into another processing engine 911. Various other implementations of the processing engine 911 are possible.

Outputs from the last row in the processing engine array 910 can be temporarily stored in the results buffer 912. The results can be intermediate results, which can be written to the memory banks 914 to be provided to the processing engine array 910 for additional computation. Alternatively, the results can be final results, which, once written to the memory banks 914 can be read from the memory subsystem 904 over the communication fabric 920, to be output by the system.

In some implementations, the accelerator 902 includes an activation engine 916. In these implementations, the activation engine 916 can combine the results from the processing engine array 910 into one or more output activations. For example, for a convolutional neural network, convolutions from multiple channels can be summed to produce an output activation for a single channel. In other examples, accumulating results from one or more columns in the processing engine array 910 may be needed to produce an output activation for a single node in the neural network. In some examples, activation engine 916 can be bypassed.

In various examples, the activation engine 916 can include multiple separate execution channels. In these examples, the execution channels can correspond to the columns of the processing engine array 910, and can perform an operation on the outputs of a column, the result of which can be stored in the memory subsystem 904. In these examples, the activation engine 916 may be able to perform between 1 and n parallel computations, where n is equal to the number of columns in the processing engine array 910. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 902 can include a pooling engine 918. Pooling is the combining of outputs of the columns of the processing engine array 910. Combining can include for example, computing a maximum value, a minimum value, an average value, a median value, a summation, a multiplication, or another logical or mathematical combination. In various examples, the pooling engine 918 can include multiple execution channels that can operating on values from corresponding columns of the processing engine array 910. In these examples, the pooling engine 918 may be able to perform between 1 and n parallel computations, where n is equal to the number of columns in the processing engine array 910. In various examples, execution channels of the pooling engine 918 can operate in parallel and/or simultaneously. In some examples, the pooling engine 918 can be bypassed.

Herein, the activation engine 916 and the pooling engine 918 may be referred to collectively as execution engines. The processing engine array 910 is another example of an execution engine. Another example of an execution engine is a Direct Memory Access (DMA) engine, which may be located outside the accelerator 902.

Input data 950 can arrive over the communication fabric 920. The communication fabric 920 can connect the accelerator 902 to other components of a processor, such as a DMA engine that can obtain input data 950 from an Input/Output (I/O) device, a storage drive, or a network interface. The input data 950 can be, for example one-dimensional data, such as a character string or numerical sequence, or two-dimensional data, such as an array of pixel values for an image or frequency and amplitude values over time for an audio signal. In some examples, the input data 950 can be three-dimensional, as may be the case with, for example, the situational information used by a self-driving car or virtual reality data. In some implementations, the memory subsystem 904 can include a separate buffer for the input data 950. In some implementations, the input data 950 can be stored in the memory banks 914 when the accelerator 902 receives the input data 950.

In some examples, the accelerator 902 can implement a neural network processing engine. In these examples, the accelerator 902, for a set of input data 950, can execute a neural network to perform a task for which the neural network was trained. Executing a neural network on a set of input data can be referred to as inference or performing inference.

The weights for the neural network can be stored in the memory subsystem 904, along with input data 950 on which the neural network will operate. The neural network can also include instructions, which can program the processing engine array 910 to perform various computations on the weights and the input data. The instructions can also be stored in the memory subsystem 904, in the memory banks 914 or in a separate instruction buffer. The processing engine array 910 can output intermediate results, which represent the outputs of individual layers of the neural network. In some cases, the activation engine 916 and/or pooling engine 918 may be enabled for computations called for by certain layers of the neural network. The accelerator 902 can store the intermediate results in the memory subsystem 904 for inputting into the processing engine array 910 to compute results for the next layer of the neural network.

The processing engine array 910 can further output final results from a last layer of the neural network. The final results can be stored in the memory subsystem 904 and then be copied out to host processor memory or to another location.

Figure 10:
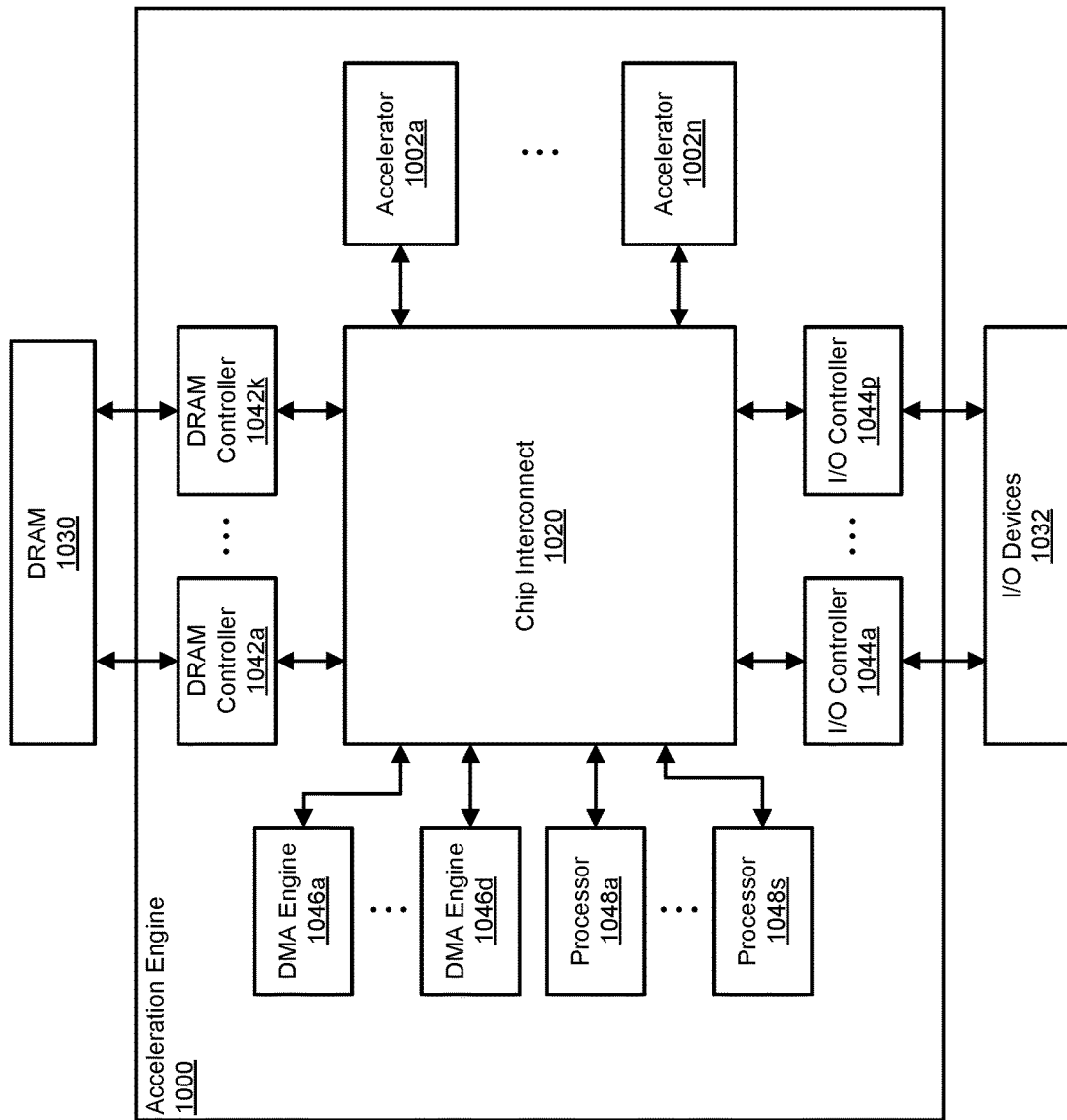
FIG. 10 illustrates a block diagram of an example of an acceleration engine.

FIG. 10 includes a block diagram that illustrates an example of an acceleration engine 1000. The acceleration engine 1000 is an example of an integrated circuit that can include one or more accelerators 1002a-1002n that may be similar to the accelerator illustrated in FIG. 9.

In the example of FIG. 10, the acceleration engine 1000 includes multiple accelerators 1002a-1002n, each of which can perform a set of operations. In various examples, the accelerators 1002a-1002n are for particular types of operations, so that the accelerators 1002a-1002n can perform the operations much faster than when similar operations are performed by a general-purpose processor. In various examples, to perform a set of operations, input data on which the operations are to be performed must first be moved into the accelerators 1002a-1002n. Additionally, in some cases, program code is also moved into the accelerators 1002a-1002n, which programs the operations that the accelerators 1002a-1002n will perform on the data. In the illustrated example, the acceleration engine 1000 includes n accelerators 1002a-1002n. Examples of accelerators that can be included in the acceleration engine 1000 include graphics accelerators, floating point accelerators, neural network accelerators, and others. In various examples, the accelerators 1002a-1002n can each be the same (e.g., each of the is a graphics accelerator) or can be different (e.g., the accelerators 1002a-1002n include a graphics accelerator, a floating-point accelerator, and neural network accelerator).

The example acceleration engine 1000 further includes DRAM controllers 1042a-1042k for communicating with an external memory. The external memory is implemented, in this example, using DRAM 1030. In the illustrated example, the acceleration engine 1000 includes k DRAM controllers 1042a-1042k, each of which may be able to communicate with an independent set of banks of DRAM. In other examples, other types of RAM technology can be used for the external memory. The DRAM controllers 1042a-1042k can also be referred to as memory controllers.

In various examples, input data and/or program code for the accelerators 1002a-1002n can be stored in the DRAM 1030. Different programs can cause the accelerators 1002a-1002n to perform different operations. For example, when one of the accelerators is a neural network accelerator, one program can configure the neural network accelerator to perform speech recognition while another program can configure the neural network accelerator to perform image recognition. In various examples, different accelerators 1002a-1002n can be programmed with different programs, so that each performs a different set of operations. In various examples, the processors 1048a-1048s can manage moving of program code from the DRAM 1030 to the accelerators 1002a-1002n.

The example acceleration engine 1000 further includes I/O controllers 1044a-1044p for communicating with I/O devices 1032 in the system. The acceleration engine 1000 can communicate with I/O devices over, for example, a processor bus. In some examples, the processor bus can be implemented using Peripheral Component Interconnect (PCI) and/or a variation of the PCI bus protocol. The processor bus can connect the acceleration engine 1000 to I/O devices such as, for example, input and output devices, memory controllers, storage devices, and/or network interface cards, among other things. In some examples, the I/O controllers 1044-1044p can enable the acceleration engine 1000 to act as an I/O device for a host processor. For example, the acceleration engine 1000 can be the recipient of input data from the host processor, and a command indicating an operation to be performed on the input data (e.g., a particular computation or analysis). In the illustrated example, the acceleration engine 1000 includes p I/O controllers 1044a-1044p, each of which may include a separate root complex and may communicate with a separate set of I/O devices 1032. In other examples, other standardized bus protocols, such as Ultra Path Interconnect (UPI) can be used for the host bus. In other examples, a proprietary bus protocol can be used.

Movement of data in the acceleration engine 1000 can be managed by one or more processors 1048a-1048s, which can also be referred to as data management processors. In the example of FIG. 10, the acceleration engine 1000 includes s processors 1048a-1048sincorporated into the device (e.g., on the same silicon die). In other examples, the processors 1048a-1048s can be external to the acceleration engine 1000 (e.g., on a different die and/or in a different package). In some examples, the processors 1048a-1048s can manage the movement of data from I/O devices 1032 to the accelerators 1002a-1002n or the DRAM 1030. For example, input data may be located at an I/O device 1032 or in processor memory, and the processors 1048a-1048s can move the input from the I/O device 1032 or processor memory into an accelerator or into DRAM 1030. As another example, program code for the accelerators 1002a-1002n may be located on an I/O device 1032 or in processor memory.

The example acceleration engine 1000 further includes DMA engines 1046a-1046dthat can move data between the accelerators 1002a-1002n, DRAM controllers 1042a-1042k, and I/O controllers 1044a-1044p. In the illustrated example, the acceleration engine 1000 includes d DMA engines 1046a-1046d. In some implementations, the DMA engines 1046a-1046d can be assigned to specific tasks, such as moving data from the DRAM controllers 1042a-1042d to the accelerators 1002a-1002n, or moving data between the I/O controllers 1044a-1044p and the accelerators 1002a-1002n. These tasks can be assigned, for example, by enqueueing descriptors with the DMA engines 1046a-1046d, where a descriptor identifies an address for a block of data and an operation (e.g., a read or a write) to perform. A descriptor, for example, can direct a DMA engine to instruct a DMA controller to read a block of data from DRAM 1030. A descriptor can, as a further example, instruct the DMA engine to write data, read by the DMA controller, to an accelerator. Further descriptors can be used to move data from an accelerator to DRAM 1030.

In various examples, each of the processors 1048a-1048s can be responsible for managing the data movement for a different accelerator. In some examples, a processor may manage the data movement for more than one accelerator. Similarly, in various examples, each of the processors 1048a-1048s can be assigned to one or more DMA engines 1046a-1046d. In these and other examples, associations between processors 1048a-1048s, accelerators 1002a-1002n, and DMA engines 1046a-1046d are determined by program code being executed by each respective processor.

In the example acceleration engine 1000, the various components can communicate over a chip interconnect 1020. The chip interconnect 1020 primarily includes wiring for routing data between the components of the acceleration engine 1000. In some cases, the chip interconnect 1020 can include a minimal amount of logic, such as multiplexors to control the direction of data, flip-flops for handling clock domain crossings, and timing logic.

Figure 11:
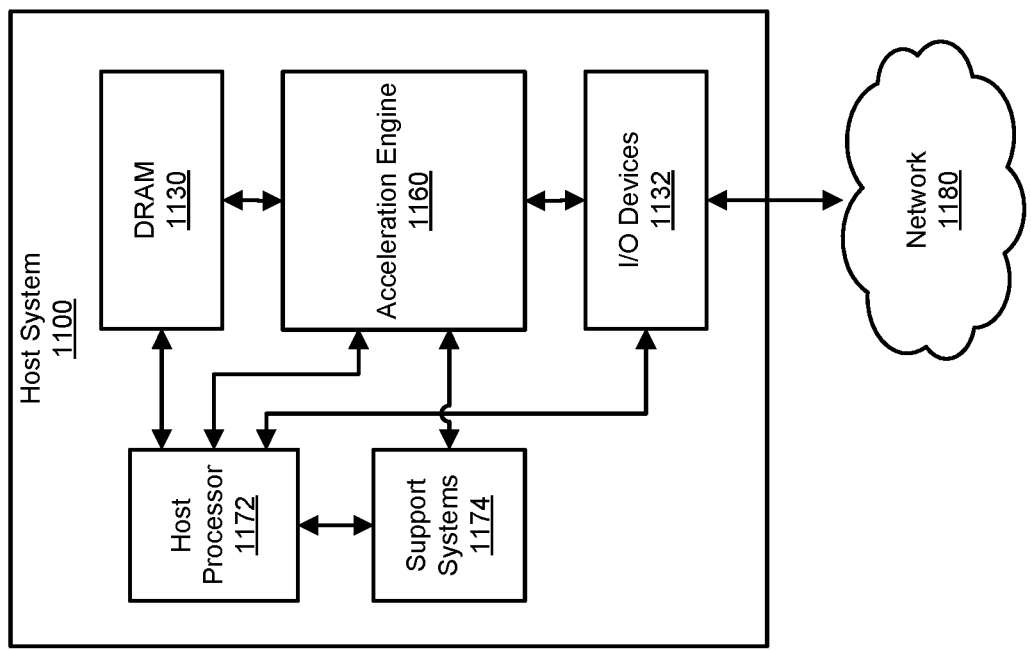
FIG. 11 illustrates a block diagram of an example of a host system.

FIG. 11 includes a block diagram that illustrates an example of a host system 1100 in which an acceleration engine 1160 can be used. The acceleration engine 1160 of FIG. 11 is an example of a device that can include one or more accelerators such as is illustrated in FIG. 10. The example host system 1100 of FIG. 11 includes the acceleration engine 1160, a host processor 1172, DRAM 1130 or processor memory, I/O devices 1132, and support systems 1174. In various implementations, the host system 1100 can include other hardware that is not illustrated here.

The host processor 1172 is a general-purpose integrated circuit that is capable of executing program instructions. In some examples, the host processor 1172 can include multiple processing cores. A multi-core processor may include multiple processing units within the same processor. In some examples, the host system 1100 can include more than one host processor 1172. In some examples, the host processor 1172 and the acceleration engine 1160 can be one chip, such as, one or more integrated circuits within the same package.

In various examples, the host processor 1172 can communicate with other components in the host system 1100 over one or more communication channels. For example, the host system 1100 can include a host processor bus, which the host processor 1172 can use to communicate with the DRAM 1130, for example. As another example, the host system 1100 can include an I/O bus, such as a PCI-based bus, over which the host processor 1172 can communicate with the acceleration engine 1160 and/or the I/O devices 1132, for example. In various examples, the host system 1100 can, alternatively or additionally, include other communication channels or busses, such as serial busses, power management busses, storage device busses, and so on.

In some examples, software programs executing on the host processor 1172 can receive or generate input for processing by the acceleration engine 1160. In some examples, the programs can select an appropriate neural network to execute for a given input. For example, a program may be for language translation, and can select one or more neural networks capable of speech recognition and/or machine translation. In these and other examples, the programs can configure the acceleration engine 1160 with the neural network to execute, and/or can select a neural network processing engine on the acceleration engine 1160 that has previously been configured to execute the desired neural network. In some examples, once the acceleration engine 1160 has started an inference on input data, the host processor 1172 can manage the movement of data (such as weights, instructions, intermediate results, results of conditional layers, and/or final results) into or out of the acceleration engine 1160.

In some examples, a software program that is using the acceleration engine 1160 to conduct an inference can read the result from a conditional layer from the acceleration engine 1160 and/or from a storage location, such as in DRAM 1130. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1130 is memory that is used by the host processor 1172 for storage of program code that the host processor 1172 is in the process of executing, as well as values that are being operated on. In some examples, the data for a neural network (e.g., weight values, instructions, and other data) can be all or partially stored in the DRAM 1130. DRAM is a common term for processor memory, and though DRAM is volatile memory, processor memory can be volatile and/or non-volatile. Though not illustrated here, the host system 1100 can include other volatile and non-volatile memories for other purposes. For example, the host system 1100 can include a Read-Only Memory (ROM) that stores boot code for booting the host system 1100 at power on, and/or Basic Input/Output System (BIOS) code.

Though not illustrated here, the DRAM 1130 can store instructions for various programs, which can be loaded into and be executed by the host processor 1172. For example, the DRAM 1130 can be storing instructions for an operating system, one or more data stores, one or more application programs, one or more drivers, and/or services for implementing the features disclosed herein.

The operating system can manage and orchestrate the overall operation of the host system 1100, such as scheduling tasks, executing applications, and/or controller peripheral devices, among other operations. In some examples, a host system 1100 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1100. For example, some drivers can provide communication between the operating system and peripheral devices or I/O devices 1132. Alternatively or additionally, some drivers may provide communication between application programs and the operating system, and/or application programs and peripheral devices accessible to the host system 1100. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1132 can include hardware for connecting to user input and output devices, such as keyboards, mice, pens, tablets, voice input devices, touch input devices, displays or monitors, speakers, and printers, among other devices. The I/O devices 1132 can also include storage drives and/or network interfaces for connecting to a network 1180. For example, the host system 1100 can use a network interface to communicate with storage devices, user terminals, other computing devices or servers, and/or other networks, among various examples.

In various examples, one or more of the I/O devices 1132 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1100 or may be in an external enclosure. A storage device can be fixed (e.g., attached by screws) or removable (e.g., having a physical release mechanism and possibly a hot-plug mechanism).

Storage devices, the DRAM 1130, and any other memory component in the host system 1100 are examples of computer-readable storage media. Computer-readable storage media are physical mediums that are capable of storing data in a format that can be read by a device such as the host processor 1172. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1132 can be PCI-based devices. In these examples, a PCI-based I/O device includes a PCI interface for communicating with the host system 1100. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1174 can include hardware for coordinating the operations of the acceleration engine 1160. For example, the support systems 1174 can include a microprocessor that coordinates the activities of the acceleration engine 1160, including moving data around on the acceleration engine 1160. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1172. In some examples, the program executed by the microprocessor is stored on the hardware of microprocessor, or on a non-volatile memory chip in the host system 1100. In some examples, the microprocessor and the acceleration engine 1160 can be on chip, such as one integrated circuit on the same die and in the same package.

In some examples, the support systems 1174 can be responsible for taking instructions from the host processor 1172 when programs executing on the host processor 1172 request the execution of a neural network. For example, the host processor 1172 can provide the support systems 1174 with a set of input data and a task that is to be performed on the set of input data. In this example, the support systems 1174 can identify a neural network that can perform the task, and can program the acceleration engine 1160 to execute the neural network on the set of input data. In some examples, the support systems 1174 only needs to select an appropriate neural network processing engine of the neural network processor. In some examples, the support systems 1174 may need to load the data for the neural network onto the acceleration engine 1160 before the acceleration engine 1160 can start executing the neural network. In these and other examples, the support systems 1174 can further receive the output of executing the neural network, and provide the output back to the host processor 1172.

In some examples, the operations of the support systems 1174 can be handled by the host processor 1172. In these examples, the support systems 1174 may not be needed and can be omitted from the host system 1100.

In various examples, the host system 1100 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1100 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 12:
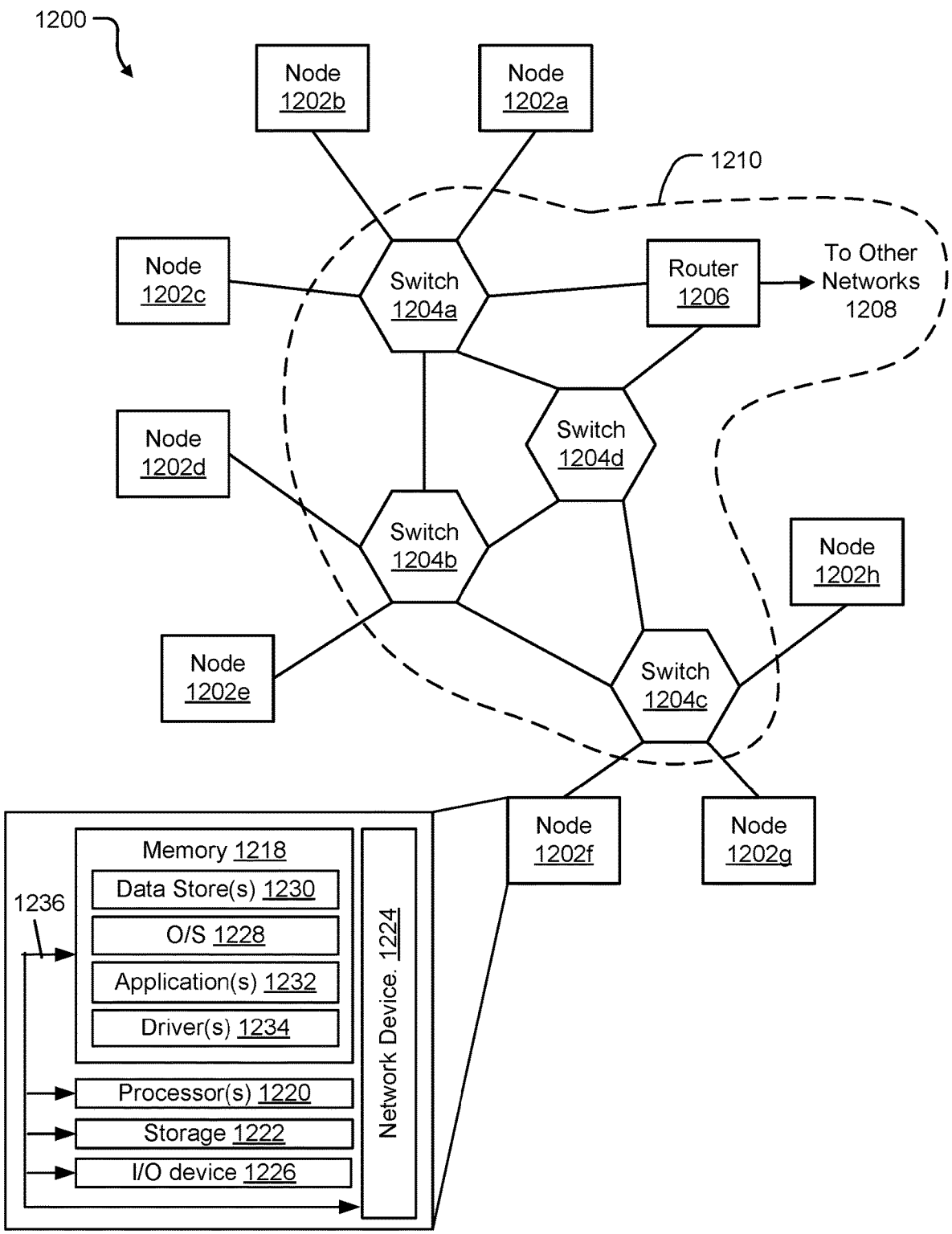
FIG. 12 illustrates a block diagram of an example network.

FIG. 12 includes a diagram of an example network 1200, which can include one or more host systems, such as the host system illustrated in FIG. 11. For example, the example network 1200 of FIG. 12 includes multiple nodes 1202*a*-1202*h*, one or more of which can be a host system such as is illustrated in FIG. 11. Others of the nodes 1202*a*-1202*h* can be other computing devices, each of which include at least a memory for storing program instructions, a processor for executing the instructions, and a network interface for connecting to the network 1200.

In various examples, the network 1200 can be used to process data. For example, input data can be received at one of the nodes 1202*a*-1202*h* or from other networks 1208 with which the network 1200 can communicate. In this example, the input data can be directed to a node in the network 1200 that includes an acceleration engine, for the acceleration engine to operate on and produce a result. The result can then be transferred to the node or other network from which the input data was received. In various examples, input data can be accumulated from various sources, including one or more of the nodes 1202*a*-1202*h* and/or computing devices located in the other networks 1208, and the accumulated input data can be directed to one or more host systems in the network 1200. Results from the host systems can then be distributed back to the sources from which the input data was gathered.

In various examples, one or more of the nodes 1202*a*-1202*h* can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 12, the nodes 1202*a*-1202*h* are connected to one another using a switched architecture with point-to point links. The switched architecture includes multiple switches 1204*a*-1204*d*, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1204*a*-1204*d* of FIG. 12 may be connected to the nodes 1202*a*-1202*h* and provide multiple paths between any two nodes.

The network 1200 may also include one or more network devices for connection with other networks 1208, such as a router 1206. Routers use headers and forwarding tables to determine the best path for forwarding the packets, and use protocols such as internet control message protocol (ICMP) to communicate with each other and configure the best route between any two devices. The router 1206 of FIG. 12 can be used to connect to other networks 1208 such as subnets, LANs, wide area networks (WANs), and/or the Internet.

In some examples, network 1200 may include any one or a combination of many different types of networks, such as cable networks, the Internet, wireless networks, cellular networks and other private and/or public networks. The interconnected switches 1204*a*-1204*d* and the router 1206, if present, may be referred to as a switch fabric 1210, a fabric, a network fabric, or simply a network. In the context of a computer network, terms "fabric" and "network" may be used interchangeably herein.

The nodes 1202*a*-1202*h* may be any combination of host systems, processor nodes, storage subsystems, and I/O chassis that represent user devices, service provider computers or third-party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202*a*-1202*h* may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202*a*-1202*h*, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support nodes 1202*a*-1202*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the network(s) 1208 to user devices. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1224 that allow the node(s) 1202a-1202h to communicate with a stored database, another computing device or server, user terminals and/or other devices on the network(s) 1200.

In some implementations, the network device 1224 is a peripheral device, such as a PCI-based device. In these implementations, the network device 1224 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1224 may be connected to a computing system using a PCIe interface.

A PCI-based device may include one or more functions. A "function" describes operations that may be provided by the network device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for partitioning a neural network model for execution on a plurality of processing cores, the method comprising:
    obtaining a description of the neural network model;
    generating a representation of the neural network model as a directed acyclic hypergraph having nodes and edges connecting the nodes, wherein the nodes represent neural network computations, and the edges represent transfer of data between nodes;
    performing an initial partitioning of the directed acyclic hypergraph into a number of partitions each corresponding to a processing core;
    for each of the partitions:
        calculating an execution latency of the partition by aggregating:
            a total number of compute clock cycles to perform computations for nodes in the partition; and
            a total number of weight loading clock cycles for loading weights used by the nodes in the partition, the weights being loaded from system memory to a cache memory of the corresponding processing core; and
        determining an amount of data being outputted from the partition;
    optimizing the partitions by iteratively performing:
        determining which node along a partition boundary, when moved from a source partition to a target partition, provides a largest improvement in reducing an amount of data being transferred from the source partition to the target partition and in balancing execution latencies of the partitions;
        moving the node from the source partition to the target partition in response to determining that such move provides the largest improvement; and
        recalculating the execution latencies of the partitions and the amount of data being transferred between the partitions;
    loading the neural network model onto the processing cores according to the optimized partitions; and
    executing the neural network model loaded onto the processing cores.

2. The computer-implemented method of claim 1, wherein the total number of weight loading clock cycles for loading weights used by the nodes in the partition is zero when a number of weights used by the partition is within a weight storage capacity of a cache memory of the processing core corresponding to the partition.

3. The computer-implemented method of claim 1, further comprising moving a portion of another node from the source partition to the target partition by replicating weights used by that other node into the target partition.

4. The computer-implemented method of claim 1, wherein the optimized partitions include a first partition and a second partition,
    wherein a first total number of compute clock cycles of the first partition is greater than a second total number of compute clock cycles of the second partition, and
    wherein a first total number of weight loading clock cycles of the first partition is less than a second total number of weight loading clock cycles of the second partition.

5. A computer-implemented method comprising:
    performing an initial partitioning of a neural network model into partitions for execution on a plurality of processing integrated circuit devices, each partition corresponding to a processing integrated circuit device;
    calculating, for each partition, an execution latency by aggregating compute clock cycles to perform computations in the partition, and weight loading clock cycles for loading weights of the neural network model used in the partition from system memory into a cache memory of the corresponding processing integrated circuit device, the weight loading clock cycles determined based on a number of weights used in the partition;

determining, for each partition, an amount of data being outputted from the partition;

subsequent to the initial partitioning, adjusting the partitions by moving computations from a source partition to a target partition to change execution latencies of the partitions and an amount of data being transferred from the source partition to the target partition; and generating instructions according to the adjusted partitions for programming the processing integrated circuit devices to execute the neural network model.

6. The computer-implemented method of claim 5, wherein the neural network model is represented as a directed acyclic hypergraph having nodes and edges connecting the nodes, and each partition is represented as a corresponding directed acyclic sub-hypergraph of the directed acyclic hypergraph.

7. The computer-implemented method of claim 6, wherein moving computations from a source partition to a target partition includes moving a node from the source partition to the target partition.

8. The computer-implemented method of claim 7, wherein moving the node from the source partition to the target partition includes:

subtracting compute clock cycles attributed to the node from the source partition, and adding the compute clock cycles attributed to the node to the target partition;

subtracting a number of weights attributed to the node from the source partition and adding the number of weights attributed to the node to the target partition; and determining whether to adjust the weight loading clock cycles for each of the source partition and the target partition.

9. The computer-implemented method of claim 8, further comprising:

determining not to adjust the weight loading clock cycles for the target partition when a number of weights used by the target partition after moving the node is below a threshold corresponding to a weight cache memory capacity of the processing integrated circuit device of the target partition.

10. The computer-implemented method of claim 8, further comprising:

determining a change in the amount of data being transferred from the source partition to the target partition based on a difference between an input tensor size and an output tensor size of the node.

11. The computer-implemented method of claim 6, wherein moving computations from a source partition to a target partition includes moving a portion of a node from the source partition to the target partition.

12. The computer-implemented method of claim 11, wherein moving the portion of the node includes replicating weights used by the node into the target partition, and increasing the number of weights used by the target partition without adjusting the number of weights used by the source partition.

13. The computer-implemented method of claim 12, wherein moving the portion of the node does not change the weight loading clock cycles for the source partition and the target partition.

14. The computer-implemented method of claim 6, wherein performing the initial partitioning of the neural network model includes traversing backwards on the directed acyclic hypergraph starting from output nodes of the directed acyclic hypergraph to sequentially set a partition boundary when an aggregated compute load of traversed nodes reaches a compute threshold for the processing integrated circuit device.

15. The computer-implemented method of claim 6, wherein performing the initial partitioning of the neural network model includes hierarchically dividing the directed acyclic hypergraph based on compute load of the nodes.

16. The computer-implemented method of claim 6, further storing a number of compute clock cycles for each node, a number of weights used by each node, and a tensor size being transferred on each edge in a data structure.

17. The computer-implemented method of claim 5, wherein each partition represents a node in a directed acyclic hypergraph.

18. A non-transitory computer readable medium having stored therein instructions that, when executed by one or more processors, cause the one or more processors to execute a compiler, the compiler performing operations including:

performing an initial partitioning of a neural network model into partitions for execution on a plurality of processing integrated circuit devices, each partition corresponding to a processing integrated circuit device;

calculating, for each partition, an execution latency by aggregating compute clock cycles to perform computations in the partition, and weight loading clock cycles for loading weights of the neural network model used in the partition from system memory into a cache memory of the corresponding processing integrated circuit device, the weight loading clock cycles determined based on a number of weights used in the partition;

determining, for each partition, an amount of data being outputted from the partition;

subsequent to the initial partitioning, adjusting the partitions by moving computations from a source partition to a target partition to change execution latencies of the partitions and an amount of data being transferred from the source partition to the target partition; and generating instructions according to the adjusted partitions for programming the processing integrated circuit devices to execute the neural network model.

19. The non-transitory computer readable medium of claim 18, wherein the neural network model is represented as a directed acyclic hypergraph having nodes and edges connecting the nodes, and each partition is represented as a corresponding directed acyclic sub-hypergraph of the directed acyclic hypergraph.

20. The non-transitory computer readable medium of claim 18, wherein moving computations from a source partition to a target partition includes moving a portion of a node from the source partition to the target partition.

21. The non-transitory computer readable medium of claim 19, wherein performing the initial partitioning of the neural network model includes traversing backwards on the directed acyclic hypergraph, starting from output nodes of the directed acyclic hypergraph to sequentially set a partition boundary when an aggregated compute load of traversed nodes reaches a compute threshold for the processing integrated circuit device.

* * * * *

UNITED STATES PATENT AND TRADEMARK OFFICE
CERTIFICATE OF CORRECTION

PATENT NO. : 11,797,280 B1
APPLICATION NO. : 17/305150
DATED : October 24, 2023
INVENTOR(S) : Parivallal Kannan, Fabio Nonato de Paula and Preston Pengra Briggs It is certified that error appears in the above-identified patent and that said Letters Patent is hereby corrected as shown below:

In the Claims

Column 34, Line 12: change "ther storing a number of compute clock cycles for each node," to
--ther comprising:
    storing a number of compute clock cycles for each node,--

Signed and Sealed this
Thirteenth Day of August, 2024

Katherine Kelly Vidal
*Director of the United States Patent and Trademark Office*